US009925887B2

(12) United States Patent
McGrath et al.

(10) Patent No.: US 9,925,887 B2
(45) Date of Patent: Mar. 27, 2018

(54) ELECTRIC VEHICLE CHARGING INTERFACE

(71) Applicant: Proterra Inc., Greenville, SC (US)

(72) Inventors: Seamus McGrath, Simpsonville, SC (US); Reuben Sarkar, Greenville, SC (US); Keyur Shah, Greenville, SC (US)

(73) Assignee: Proterra Inc., Greenville, SC (US)

( * ) Notice: Subject to any disclaimer, the term of this patent is extended or adjusted under 35 U.S.C. 154(b) by 201 days.

(21) Appl. No.: 14/442,200

(22) PCT Filed: Nov. 13, 2013

(86) PCT No.: PCT/US2013/069953
§ 371 (c)(1),
(2) Date: May 12, 2015

(87) PCT Pub. No.: WO2014/078456
PCT Pub. Date: May 22, 2014

(65) Prior Publication Data
US 2016/0272074 A1 Sep. 22, 2016

Related U.S. Application Data

(60) Provisional application No. 61/725,973, filed on Nov. 13, 2012.

(51) Int. Cl.
*B60L 9/00* (2006.01)
*B60L 11/18* (2006.01)
(Continued)

(52) U.S. Cl.
CPC ............. *B60L 11/185* (2013.01); *B60L 3/04* (2013.01); *B60L 5/42* (2013.01); *B60L 7/12* (2013.01);
(Continued)

(58) Field of Classification Search
CPC .......................................................... B60L 9/00
(Continued)

(56) References Cited

U.S. PATENT DOCUMENTS

RE29,994 E    5/1979  Bossi
5,461,298 A  10/1995  Lara et al.
(Continued)

FOREIGN PATENT DOCUMENTS

EP    1997668    3/2008
EP    2014505    1/2009
(Continued)

OTHER PUBLICATIONS

Extended European Search Report dated Jul. 22, 2016, issued in corresponding EP application No. 13855153.6 (8 pgs).
(Continued)

*Primary Examiner* — Thuan Do
(74) *Attorney, Agent, or Firm* — Bookoff McAndrews, PLLC

(57) ABSTRACT

The present disclosure provides systems and methods for enabling fast charging of an electric vehicle at a charging station. In one embodiment, an electric vehicle in positioned in a given location for charging and/or discharging. A charging arm comprising a plurality of charging brushes is then positioned relative to the position of the electric vehicle. The plurality of charging brushes on the charging arm is positioned to contact a charging interface of the electric vehicle. The charging brushes are moved relative to the charging interface such that a portion of the charging brushes is removed as a result of the movement.

20 Claims, 22 Drawing Sheets

(51) Int. Cl.

| | |
|---|---|
| *B60L 3/04* | (2006.01) |
| *B60L 7/12* | (2006.01) |
| *B60L 7/26* | (2006.01) |
| *B60L 11/00* | (2006.01) |
| *B60L 11/14* | (2006.01) |
| *B60L 15/20* | (2006.01) |
| *B60L 5/42* | (2006.01) |
| *B60M 1/36* | (2006.01) |
| *B60M 7/00* | (2006.01) |

(52) U.S. Cl.
CPC ....... *B60L 7/26* (2013.01); *B60L 9/00* (2013.01); *B60L 11/005* (2013.01); *B60L 11/14* (2013.01); *B60L 11/1816* (2013.01); *B60L 11/1818* (2013.01); *B60L 11/1824* (2013.01); *B60L 11/1833* (2013.01); *B60L 11/1837* (2013.01); *B60L 11/1846* (2013.01); *B60L 11/1864* (2013.01); *B60L 11/1877* (2013.01); *B60L 11/1887* (2013.01); *B60L 15/2009* (2013.01); *B60M 1/36* (2013.01); *B60M 7/003* (2013.01); *B60L 2200/18* (2013.01); *B60L 2230/10* (2013.01); *B60L 2230/22* (2013.01); *B60L 2230/24* (2013.01); *B60L 2230/26* (2013.01); *B60L 2230/28* (2013.01); *B60L 2230/30* (2013.01); *B60L 2230/32* (2013.01); *B60L 2240/12* (2013.01); *B60L 2240/24* (2013.01); *B60L 2240/26* (2013.01); *B60L 2240/32* (2013.01); *B60L 2240/36* (2013.01); *B60L 2240/423* (2013.01); *B60L 2240/547* (2013.01); *B60L 2240/549* (2013.01); *B60L 2240/662* (2013.01); *B60L 2240/665* (2013.01); *B60L 2240/70* (2013.01); *B60L 2240/80* (2013.01); *B60L 2250/12* (2013.01); *B60L 2250/16* (2013.01); *B60L 2270/145* (2013.01); *Y02T 10/645* (2013.01); *Y02T 10/70* (2013.01); *Y02T 10/7022* (2013.01); *Y02T 10/7061* (2013.01); *Y02T 10/7077* (2013.01); *Y02T 10/7088* (2013.01); *Y02T 10/72* (2013.01); *Y02T 10/7275* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/169* (2013.01); *Y02T 90/34* (2013.01); *Y04S 30/14* (2013.01)

(58) Field of Classification Search
USPC ........................................................ 320/109
See application file for complete search history.

(56) References Cited

U.S. PATENT DOCUMENTS

| | | | |
|---|---|---|---|
| 5,821,731 | A | 10/1998 | Kuki et al. |
| 6,881,393 | B2 | 4/2005 | Spitler et al. |
| 6,890,510 | B2 | 5/2005 | Spitler et al. |
| 6,974,566 | B2 | 12/2005 | Sabacky et al. |
| 8,324,858 | B2 | 12/2012 | Hill et al. |
| 2005/0124466 | A1 | 6/2005 | Rogers |
| 2005/0132562 | A1 | 6/2005 | Saito et al. |
| 2007/0284159 | A1 | 12/2007 | Takami et al. |
| 2010/0025132 | A1 | 2/2010 | Hill et al. |
| 2011/0233018 | A1 | 9/2011 | Richards |
| 2012/0111682 | A1 | 5/2012 | Andre |
| 2012/0280656 | A1 | 11/2012 | Bedell |
| 2013/0193918 | A1* | 8/2013 | Sarkar ................ B60L 3/04 320/109 |

FOREIGN PATENT DOCUMENTS

| | | |
|---|---|---|
| EP | 2380767 | 10/2011 |
| FR | 2 966 397 | 4/2012 |
| JP | 05-292607 | 11/1993 |
| JP | 2010166706 | 7/2010 |
| JP | 2012-027989 | 2/2012 |
| KR | 2010 0126120 | 12/2010 |
| WO | WO 2008/107767 | 12/2008 |
| WO | WO 2009/014543 | 1/2009 |
| WO | WO 2011/079215 | 6/2011 |
| WO | WO-2011/123048 | 10/2011 |
| WO | WO 2011/139680 | 11/2011 |

OTHER PUBLICATIONS

International Preliminary Report on Patentability and Written Opinion; dated May 19, 2015 for related PCT/US2013/069953, (6 pgs).

* cited by examiner

*NOTE: Trouble during charging will result in a failsafe condition (arm up), driver will be instructed to call dispatch if there is a problem (reported on driver display)

| | BUS | CHARGE STATION |
|---|---|---|
| Operation | Controls Overview | |
| A | Vehicle controller to look for CAN messages from bluetooth | Wait for CAN traffic from bus |
| | | Perform periodic air pressure test |
| B | Start main routine upon receipt of charge station CAN msg | Check for air pressure |
| | Set charger readiness flag upon receiving good comm from charge station | Check for ok from charger |
| | DISPLAY which charge station to go to or current readiness of station? | Send ok to charge flag |
| | DISPLAY precise speed of bus to driver on display (x.x mph) | Check for ok from RFID |
| | Apply filter to charge station CAN msgs based on which side of charger (using RFID) | check for arm position up so that ultrasonic sensor reading is accurate |
| | DISPLAY that connection has been made as soon as possible. Driver will need training to know to stop by themselves if no connection signal | |
| C | No control info for initial L/R placement of bus | |
| | DISPLAY SLOW DOWN if driver is going too fast, bus will not charge | |
| D-E | Monitor driver speed, disallow docking if speed too high | RFID will either come through ethernet to CAN gateway or potentially just from reader outputs |
| | DISPLAY bus speed and whether or not auto control take place | |
| | Wait for CAN message indicating RFID has detected bus. | |
| | Ensure bus is in 1st gear | |
| | Upon receipt of RFID CAN message begin vehicle speed limiting | |
| | Ramp vehicle speed to 3mph | |
| | Wait for signal from ultrasonic sensor | |
| | Potentially disallow charging if ride-height is not at nominal? Better to be able to accommodate. Maybe use height deltas | |
| | DISPLAY, bus will stop in position | |

FIG. 7A

|  | BUS | CHARGE STATION |
|---|---|---|
| Operation | Controls Overview | |
| F-G | CAN message from ultrasonic sensor indicated bus has passed under arm | Check for proper signal from ultrasonic sensors (must be within a window allowing for ride height difference) |
| | begin distance integration to reset point 1 (front of air conditioning unit) | |
| | watchdog time to reset point 1 based on avg speed | |
| | reset points are specific measurements from the ultrasonic sensor | |
| | Store time to reset point 1 in a register and check against bounds | |
| | Continue integration from front of bus if time to reset point 1 is out of bounds | |
| | Reset integration if point 1 if in bounds | |
| | Begin distance integration to reset point 2 (back of air conditioning unit) | |
| | watchdog time to reset point 2 based on avg speed | |
| | Store time to reset point 2 in a register and check against bounds | |
| | Check time to initial integration as a potential back-up | |
| | Wait for final location point 3 (portion of ramp that is lower by several inches in) | |
| | Time to this point must be carefully bounded. | |
| | Incorrect Left and Right location will look like no slot to the measurement sensor | |
| | | |
| H | If final point measurement and time are both ok, begin bus stop routine | |
| | disable doors unless parking brake is set incase driver stop bus too soon | |
| | if driver stops too soon, DISPLAY, to charge bus, release brake and pull ahead slowly when safe. Bus will automatically stop in the correct position | |
| J | Ramp bus speed to zero using regen (this should be done in as short a time as comfortably possible) | |
| | Wait for bus to reach zero speed | |
| | shift to neutral | |
| | apply rear door brake interlock | |
| | DISPLAY waiting for charge arm to lower, bus will move ahead automatically | |

FIG 7B

|  | BUS | CHARGE STATION |
|---|---|---|
| Operation | Controls Overview |  |
| K | begin arm lower sub-routine | actuate arm down solenoid |
|  | send signal that bus is in position | send arm moving, down and head down switch signals |
|  | lower arm |  |
|  | check for arm movement by loss of home position |  |
|  | check for arm cylinder down and then wait for head down microswitches |  |
| L | once all switches are good, begin final bus movement sub-routine |  |
|  |  |  |

FIG. 7C

|  | BUS | CHARGE STATION |
|---|---|---|
| Operation | Controls Overview |  |
| M | DISPLAY bus will move forward automatically and then stop to charge, release brake pedal. |  |
|  | check for driver off pedal |  |
|  | send motor tq signal as low as possible to move bus slowly and smoothly |  |
|  | begin distance integration as soon as bus moves to use a watchdog |  |
|  | wait for pilot signal to indicate head in position |  |
| N | Autostop bus once in position using the same procedure as operation J |  |
| P | Regen bus to zero |  |
|  | shift transmission to natural |  |
|  | apply rear door brake interlock |  |
|  | DISPLAY set park brake to allow doors to open and bus to charge |  |
| Q | check for parking brake |  |
| R | allow doors to open |  |
|  | DISPLAY bus charging | Check for pilot signal from charger |
|  |  |  |

FIG. 7D

|  | BUS | CHARGE STATION |
|---|---|---|
| Operation | Controls Overview |  |
| S | Begin charging sub-routine |  |
|  | send signal to extend ground brush | extend grounding brush air cylinder |
|  | wait for ground brush extended |  |
|  | send ac signal or tone to ensure ground is connected? |  |
|  | Signal charge brushes to extend | extend charging brush air cylinders |
| T | wait for all 10 brushes to extend |  |
|  |  | wait for charger to report bus bat voltage |
| U | Ok to start charging | charger to report time to charge? |
| W | DISPLAY charging, time to complete or percent full? | Close distribution box contactors |
|  | Stop current flow if loss of pilot, temp switches, report from BMS, report from charger, | Continuously monitor temp switches |
|  |  |  |

FIG. 7E

|  | BUS | CHARGE STATION |
|---|---|---|
| Operation | Controls Overview |  |
| Y | Log charge metrics when charge complete (time, SOC init, SOC final, total power, peak current, faults) |  |
| Z | Begin charge done sub-routine |  |
|  | stop charging | open distribution box contactors |
|  | signal release brushes | release charge brushes |
|  | wait for all ten brushes to get home | release ground |
|  | signal release ground | raise arm |
|  | wait for ground to get home | ensure arm seats home for next time |
|  | signal raise arm | cycle brushes as a preventative maintenance action? |
| AA | wait for loss of head micro switches before allowing driver to move |  |
| BB | Release rear-door brake interlock and allow movement |  |
| CC | DISPLAY charge complete, release parking brake and select gear to drive away |  |
|  | DISPLAY SOC or full fuel gauge? |  |
|  |  |  |

FIG. 7F

| | BUS | CHARGE STATION |
|---|---|---|
| Operation | Controls Overview | |
| FAULT | fault sub-routine | |
| | signal charger to stop | |
| | release brushes | |
| | disable rear-door brake interlock | |
| | allow bus movement if driver uses pedals and releases brake | |
| | signal arm up | |
| | log fault code | |
| | DISPLAY Charging stopped, contact support (number or normal trouble routine) | |
| | | |
| | | |
| | | |
| | REQUIRED DISPLAY MESSAGES | |
| | Charging station 1 and 2 ready…or not ready, etc. | |
| | Communication established, please drive slow to 5mph before charge station or auto charge will not take place(tone) | |
| | Accurate speed (x.x mph) (tone if too fast) | |
| | Speed ok, charging will take place, always be prepared to stop if required | |
| | Align painted line with steering column | |
| | SLOW DOWN, too fast , bus will not charge | |
| | To charge bus, release brake and pull ahead slowly when safe. Bus will automatically stop | |
| | Approaching initial stop position, bus will automatically stop, release brake if safe. (tone that gets quicker as bus moves closer) | |
| | Waiting for charge arm to lower, bus will move ahead automatically to charge. Release brake if safe | |
| | Connected, set parking brake to start charge and allow doors to open | |
| | Bus charging (battery SOC gauge) | |
| | FAULT, bus not charged, contact maintenance | |
| | Charging complete, select drive and release parking brake when ready | |
| | Bus out of position, drive around and try and again, do not backup | |
| | password access: diagnostic screen indicating battery specifics and fault codes | |

FIG. 7G

ELECTRIC VEHICLE CHARGING INTERFACE

CROSS-REFERENCE

This application claims priority to U.S. Provisional Patent Application No. 61/725,973, filed Nov. 13, 2012, which is entirely incorporated herein by reference.

BACKGROUND

Heavy duty battery electric vehicles can require relatively frequent charging to operate in normal service. Frequent charging at predetermined charging station locations enables energy storage systems to be sized with more certainty leading to reduce size, mass, and cost of systems. That required frequency of charging means that manual connection, such as physically plugging the vehicle in, to a charger is not acceptable. Traditionally, manually connecting the vehicle requires the driver to park and then carry high voltage cables to plug in the vehicle. In a transit center distances to charging station equipment could be quite far from the bus leading to long lengths of heavy gauge high voltage cable to reach the vehicle. Not only is this a distraction, it is not typical job task for drivers.

In addition, the speed of charging at the charging station can be very pertinent for a heavy-duty vehicle, such as a bus, that may need to be regularly recharged within small time frames to complete its suggested route. In one example, an electric vehicle may need to complete a charge in less than ten minutes that is sufficient to enable it to complete its normal route of nine to twelve miles in an hour before having to recharge.

Therefore, a need exists for improved systems and methods for connecting an electric vehicle to a charging station. A further need exists for systems and methods that enable fast charging of electric vehicles at a charging station to enable the electric vehicle to be charged in a minimal amount of time, while charging the electric vehicle to a sufficient level to enable it to complete its suggested route.

SUMMARY

The present disclosure provides systems and methods for enabling fast charge of an electric vehicle at a charging station. Various aspects of the invention described herein may be applied to any of the particular applications set forth below or for any other types of vehicles. The invention may be applied as a standalone system or method, or as part of an integrated transportation system, such as a bus system or other public transportation system. It shall be understood that different aspects of the invention can be appreciated individually, collectively, or in combination with each other.

An aspect of the invention provides a charging interface for an electric vehicle, which includes an interface body; and a contact surface coupled to the interface body, the contact surface adapted to contact charging brushes coupled to a charging connection. The contact surface is adapted to remove a portion of the charging brushes as the position of the charging brushes is moved relative to the position of the contact surface. In some examples, the contact surface is adapted to remove at least a portion, but not all, of the charging brushes as the position of the charging brushes is moved relative to the position of the contact surface. In such a case, during vehicle charging or discharging, some charging brushes can remain in contact with the contact surface.

Another aspect of the invention provides a method for enabling fast charge of an electric vehicle. The method includes positioning an electric vehicle in a desired location for charging and positioning a charging arm relative to the position of the electric vehicle, with the charging arm including a plurality of charging brushes. The method further includes positioning the plurality of charging brushes on the charging arm to contact a charging interface on the electric vehicle; and moving the charging brushes relative to the charging interface so that a portion of the charging brushes is removed as a result of the movement.

Another aspect of the invention provides system for fast charging of an electric vehicle with a charging station. The system includes an electric vehicle with a plurality of batteries and a charging connection, the charging connection further including a plurality of charging brushes. The system also includes a charging station with a charging interface, with the charging interface including an interface body, and a contact surface coupled to the interface body, the contact surface adapted to contact charging brushes coupled to a charging connection. The contact surface is adapted to remove a portion of the charging brushes as the position of the charging brushes is moved relative to the position of the contact surface.

Another aspect of the invention provides a method for fast charging an electric vehicle at a charging station. The method comprises positioning an electric vehicle in a desired location for charging, positioning a charging arm containing a plurality of charging brushes relative to the position of the electric vehicle, and positioning the charging brushes on the charging arm to contact a charging interface on the electric vehicle. The method further includes moving the charging brushes relative to the charging interface such that a portion of the charging brushes is removed as a result of the movement, charging the electric vehicle by providing electrical current from the charging station through the charging brushes and the charging interface to a plurality of batteries on the electric vehicle; positioning the charging brushes on the charging arm so that the charging brushes no longer contact the charging interface on the electric vehicle; and repositioning the charging arm away from the electric vehicle.

In accordance with some aspects of the invention, absolute reliability and repeatability of the docking and charging process may be desired to ensure continued operation. Due to the relatively harsh environment in which heavy duty vehicles operate, both the docking and battery charging process itself may preferably be capable of handling a wide range of system variability and conditions.

Some specific specifications that may be desirable may include the following. Charging can be performed on route to prevent having to remove vehicle from service and drive to a special charging station, thereby reducing duty cycle. On route charging station preferably allows different, non battery electric vehicles to pass through the station while correctly identifying when battery electric vehicles are in the terminal and require changing. For example, a compressed natural gas (CNG) or diesel powered vehicle may be allowed to use the same terminal as the battery electric vehicle. This means the docking and charging equipment preferably remains unobtrusive until required for use.

A vehicle's approach and dock with a charger is preferably safe, reliable and repeatable. A vehicle connection process may advantageously have reduced or minimal driver interaction and limited change to driver behavior.

Another aspect of the invention may be to automate all or nearly all of the entire charging process for an electric vehicle. The vehicle may connect (dock) automatically with the charge station and the battery charge process may take place automatically. This automated process ensures a proper charge every time and may allow for continuous, efficient operation of the vehicle.

Another aspect of the invention provides a charging interface for an electric vehicle, comprising an interface body; and a contact surface coupled to the interface body, wherein the contact surface is adapted to contact charging brushes coupled to a charging connection, and wherein the contact surface is adapted to remove a portion of the charging brushes as the position of the charging brushes is moved relative to the position of the contact surface.

Another aspect of the invention provides a method for charging an electric vehicle, comprising positioning an electric vehicle at a given location for charging; positioning a charging arm of a charging station relative to the position of the electric vehicle, the charging arm coupled to a plurality of charging brushes; positioning the plurality of charging brushes to contact a charging interface on the electric vehicle; and moving the charging brushes relative to the charging interface such that a portion of the charging brushes is removed from the charging interface upon movement.

Another aspect of the invention provides a system for charging of an electric vehicle with a charging station, comprising a charging station comprising a charging arm coupled to a plurality of brushes; and an electric vehicle comprising at least one battery and a charging interface electrically coupled to the at least one battery. The charging interface can comprise an interface body; and a contact surface coupled to the interface body, the contact surface adapted to contact said charging brushes. The contact surface can be adapted to remove a portion of the charging brushes as the charging brushes are moved relative to the charging interface.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 7A-7G provides a table describing the operations for an automatic docking and charging procedure.

DETAILED DESCRIPTION

Figure 1:
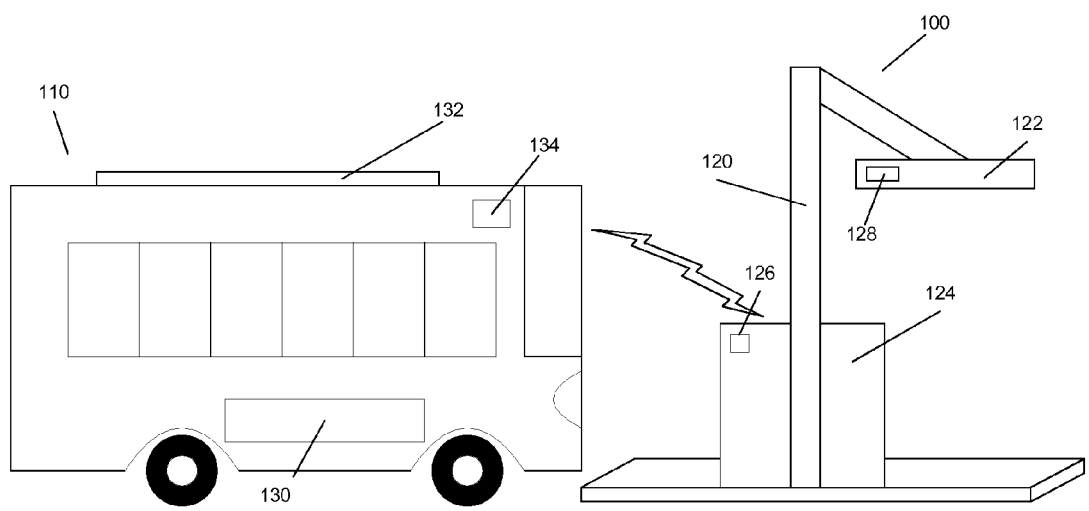
FIG. 1 shows an example of a vehicle approaching a charging station.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The present disclosure provides systems and methods for enabling fast charge of an electric vehicle at a charging station. Various aspects of the invention described herein may be applied to any of the particular applications set forth below or for any other types of vehicles. The invention may be applied as a standalone system or method, or as part of an integrated transportation system, such as a bus system or other public transportation system. It shall be understood that different aspects of the invention can be appreciated individually, collectively, or in combination with each other. The charging station may be used to transfer power to any electric vehicle, hybrid electric vehicle, or any other vehicle that may include a propulsion power source, such as a battery, ultracapacitor, or any other energy storage system. In some embodiments, an electrically powered vehicle may be a heavy duty vehicle, such as a bus or truck.

For example, electrical vehicles powered by the system may include a transit bus, a school bus, a delivery van, a shuttle bus, a tractor trailer, a class 5 truck (weighing 16,001-19,500 lbs., two-axle, six-tire single unit), a class 6 truck (weighing 19,501-26,000 lbs., three-axle single unit), a class 7 truck (weighing 26,001-33,000 lbs., four or more axle single unit), a class 8 truck (weighing 33,000 lbs. and over, four or less axle single trailer), a vehicle with a GVWR weighing over 14,000 pounds, a vehicle with a cargo to driver mass ratio of 15:1 or greater, a vehicle with six or more tires, a vehicle with three or more axles, or any other type of high occupancy or heavy-duty vehicle. In some embodiments, a charging station may charge any other electric vehicle, including passenger vehicles. Any discussion herein of electric vehicles or electrically powered vehicles may refer to any type of vehicle discussed and vice versa.

System

An example of automatic docking and charging of a battery electric vehicle involves an urban bus operating on a fixed, cyclical route. The bus may have on-board batteries to store enough energy to make one or more complete cycles of its assigned route, or legs of its assigned route. One or more of the stops on the route may be at a battery charging station. While the driver takes his normal break the vehicle is automatically docked and the batteries charged for the next route cycle. A charging station may or may not be integrated with a passenger stop. Upon final vehicle positioning relative to the charger (vehicle docked), the doors may be opened and passengers are allowed to enter and exit. The control system may be provided such that little to no additional driver interaction, beyond typical bus driving skills, is required to dock and charge the vehicle. Each operation or many of the operations of the process may be automatic and error tolerant.

This process may result in a system suitable for placement at a typical transit central station without the need for a special, battery electric bus charging station only bus stop.

In some embodiments of the invention, the charging station can comprise a charging connection, such as a charging chassis or overhang, suspended from a charging mount for establishing an electrical connection between the charging station and the electrically powered vehicle. A charging connection may have any configuration, which may include a charging arm or base that may be provided from a side or base of a charging station. The charging connection may have any orientation, which may include a downward hanging orientation, an upward extending orientation, a horizontal extending orientation, an angled orientation, or any combination thereof. The charging connection can comprise a positioning device for controlling the position or orientation of the charging connection. A power source may be provided to or at the charging station. In some instances, the power source may be a grid utility, battery, capacitor, ultracapacitor, fuel cell, generator, renewable energy source (e.g., solar, wind, hydrodynamic, geothermal, etc.), or any other power source. The power source may be in electrical communication with the charging connection.

Another aspect of the invention provides for an electric vehicle comprising contact plates for establishing an electrical connection to a charging station. The contact plates can be positioned on a top surface of the electric vehicle and be positioned in a direction that is relatively parallel to a direction of vehicle movement. For example, the contact plates may be spaced apart on the top surface of the electric vehicle. Alternatively, the contact plates may be provided on a side of the vehicle, or under the vehicle, or anywhere along a surface of the vehicle. The contact plates may be exposed on the surface of a vehicle, or may be provided beneath a cover. The electric vehicle may have one or more energy storage system (e.g., batteries, capacitors, ultracapacitors, fuel cell, etc.). The one or more energy storage systems may be in electrical communication with the contact plates.

The methods of the invention include transferring power to a vehicle using a charging station. Transferring power to the vehicle can comprise positioning the vehicle under a charging mount of the charging station and engaging a charging connection, such as a pantograph, catenary arm, charging chassis or frame, or charging overhang to establish an electrical connection between the charging station and the vehicle. Transferring power may include any form of electrical connection between a charging connection (which may have any position or orientation) and one or more contact plate (which may be located anywhere on the vehicle). A vehicle may be charged and/or discharged by establishing electrical communication between a power source and an energy storage system of the electric vehicle. For instance, an electrical connection may be made between the power source and charging connection, between the charging connection and contact plate, and between the contact plate and energy storage system.

Examples of configurations for the charging station and/or electric vehicles may include aspects, components, features, or operations provided in U.S. patent application Ser. No. 12/496,569 filed Jul. 1, 2009; U.S. Patent Application Ser. No. 61/289,755 filed Dec. 23, 2009; U.S. Patent Application Ser. No. 61/328,143 (705.101) filed Apr. 26, 2010; U.S. Pat. No. 5,461,298; U.S. Pat. No. 5,821,731; U.S. Pat. No. RE 29,994; E.P. Patent Application No. 2014505; EP Patent Application No. 1997668; PCT Publication No. WO 2008/107767; PCT Publication No. WO2009/014543, and PCT Publication No. WO2011/139680, each of which is entirely incorporated herein by reference for all purposes.

FIG. 1 shows an example of a vehicle approaching a charging station as part of a vehicle charging system provided in accordance with an embodiment of the invention. The vehicle charging system may include a charging station 100 and a vehicle 110 configured to interface with the charging station 100.

In some embodiments, the charging station 100 may be provided on a portable, semi-portable, or permanent fixed platform. In some instances, the charging station may be movable from one location to another. In some instances, it may be easily deployed at a location, but generally remain fixed at that location. It may also be fixedly integrated into a permanent structure, such as a building, platform, or support structure. One example may involve a semi-portable trailer or skid mounted fast charge station. A fast charge station may include a charge pole 120 and vehicle connector head 122, a stationary energy storage module 124, one or more signal receiver 126, and one or more sensor 128.

The charging station may include an electrical connector between the stationary energy storage system 124 and a charging interface, which may be provided on a vehicle connector head 122. The electrical connector may be formed of a conductive material, such as a metal, such as copper, aluminum, silver, gold, or any combination or alloy thereof. In some instances, non-metallic conductive materials may be used. In some embodiments, the electrical connector may be formed of one or more wires, bars, plates, or any other shape or configuration.

The charging station may include a charge pole 120. In some embodiments, the charge pole may be collapsible, such as through the use of one or more hinges that enable sections of the charge pole 120 to fold. The charge pole may include an overhanging arm, which may reach over a vehicle when the vehicle interfaces with the charging station. For example, a catenary arm may hang down from a protrusion over the vehicle, and extend downward and/or at an angle to the vehicle. Alternatively, the charge pole may protrude from a structure, or from a base or ground. The charge pole may enable an electrical connection to be made with the vehicle on the top of the vehicle, on a side of the vehicle, or underneath the vehicle. The charge pole may be collapsible, or be able to be unassembled for easy transport. The charge pole may have an elongated shape, or may have any other shape. The charge pole may be integral with a structure or separate from another structure.

The charge pole 120 may be connected to a vehicle connector head 122. The vehicle connector head may provide an electrical interface for the charging station 100 for electrically connecting with an electrical interface of the vehicle 110. As previously mentioned, the vehicle connector head may electrically interface with the vehicle, anywhere along the surface of the vehicle. The vehicle connector head and any other portion of the charging station may have a configuration that may electrically connect to a vehicle energy storage system to enable the charging and/or discharging of the vehicle energy storage system.

In some examples, a charging interface on the charging station may include a positive electrode and a negative electrode. The positive and negative electrodes may be electrically isolated and insulated from one another. The positive and negative electrodes may each be in electrical communication with the stationary energy storage system. One or more guiding feature may be provided on the charging station, which may enable the vehicle to drive up to the charging station and interface with the charging station.

For example, a vehicle may drive beneath an overhanging catenary arm of a charging station with a fast charge electrical interface, and contact the fast charge electrical interface with an electrical interface on top of the vehicle. The structure of the charging station and/or guiding feature may include flexible components or features that may accommodate variations in vehicle size, shape, or direction of travel. The charging station may also include an interface that may ensure a solid electrical connection between electrical interface of the charging station and of the vehicle. For example, one or more pressure component, which may utilize a feature such as a spring or elastic, or an irregular surface, such as brushes, may be used to ensure contact between the charging station and the vehicle.

The charging station may include a stationary energy storage system 124. Alternatively, the charging station may be directly connected to an external energy source without requiring a stationary energy storage system. The stationary energy storage system may include one or more battery, ultracapacitor, capacitor, fuel cell, flywheel, pressure accumulator, or any other way of storing energy. In some examples, the stationary energy storage may include one or more electrochemical batteries. The stationary energy storage may include batteries with any battery chemistry known in the art or later developed. Some batteries may include, but are not limited to, lead-acid ("flooded" and VRLA) batteries, NiCad batteries, nickel metal hydride batteries, lithium ion batteries, Li-ion polymer batteries, lithium titanate batteries, zinc-air batteries or molten salt batteries. The same storage units or cells may be used, or varying combinations of energy storage units or cells may be used. The energy storage units may be connected in series, or parallel, or any combination thereof. In some embodiments, groupings of energy storage units may be provided in series or in parallel, or any combination.

In some embodiments, a stationary energy storage system may be provided within a housing of the charging station. In some embodiments, the energy storage units may all be provided within a single housing or pack, or may be distributed among multiple housings or packs. As previously mentioned, the stationary energy storage system may be electrically connected to a fast charging interface 122. In some embodiments, one or more groupings of energy storage units (e.g., battery cells) may be directly or indirectly connected to the fast charging interface via one or more electrical connection.

An external energy source may be a utility or grid. In other embodiments, the external energy source may be an energy generator, such as any form of electricity generator. The external energy source may include power sources, such as power plants, or renewable energy sources, such as solar power, wind power, hydropower, biofuel, or geothermal energy sources. In some embodiments, the external energy source may include an external energy storage system, which may include batteries, ultracapacitors, fuel cells, or so forth.

The external energy source may electrically connect to a stationary energy storage system 124. Alternatively, the external energy source may be electrically connected to a vehicle connector head 122 without requiring a stationary energy storage system.

The charging station may include a controller. The controller may be able to control the rate of charge for the stationary energy storage system from the external energy source. The controller may also permit the stationary energy storage system to be charged. In some embodiments, the controller may determine whether the stationary energy storage system is charged, discharged, or if nothing happens. In some instances, the controller may be able to detect or receive information relating to the state of charge of the stationary energy storage system. Any control system may be consolidated or distributed over multiple components. Any action taken by the controller or within a vehicle charging system may be directed by tangible computer readable media, code, instructions, or logic thereof. These may be stored in a memory.

A vehicle charging system may also include a vehicle 110. Any vehicle may be able to interface with the charging station. The vehicle may be an electric or hybrid electric vehicle. In some embodiments, the vehicle may be a bus. The vehicle may also be other heavy-duty or high occupancy vehicles, as discussed previously. Any discussion herein relating to a vehicle may relate to any type of vehicle, and any discussion relating to a specific type of vehicle may relate to other types of vehicles.

A vehicle 110 may have a vehicle energy storage system 130. The vehicle energy storage system may be used as a propulsion power source for the vehicle. The vehicle energy storage system may include batteries. In some embodiments of the invention, the vehicle may have one or more additional power sources, such as a combustion engine or a fuel cell. The vehicle may be an electric battery-powered vehicle or a hybrid electric vehicle, and may be able to use the same basic battery configuration, drive motor, and controller, regardless of whether the vehicle is an all-battery vehicle or a hybrid vehicle.

In one embodiment of the invention, the vehicle energy storage system may include lithium titanate batteries. In some implementations, the propulsion power source may include batteries that are only lithium titanate batteries, without requiring any other types of batteries. The lithium titanate batteries may include any format or composition known in the art. See, e.g., U.S. Patent Publication No. 2007/0284159, U.S. Patent Publication No. 2005/0132562, U.S. Patent Publication No. 2005/0214466, U.S. Pat. No. 6,890,510, U.S. Pat. No. 6,974,566, and U.S. Pat. No. 6,881,393, each of which is entirely incorporated herein by reference for all purposes.

In accordance with another embodiment of the invention, the vehicle energy storage system may include batteries with any battery chemistry known in the art or later developed. Such electric or hybrid electric vehicle batteries may include, but are not limited to, lead-acid ("flooded" and VRLA) batteries, NiCad batteries, nickel metal hydride batteries, lithium ion batteries, Li-ion polymer batteries, zinc-air batteries or molten salt batteries. In some alternate embodiments, the vehicle energy storage systems may include a combination of lithium titanate batteries and other types of batteries or ultra capacitors.

The use of lithium titanate batteries may enable rapid charging of a vehicle, and a long battery life. In some embodiments of the invention a vehicle energy storage system may be able to charge to a very high state of charge within minutes. For instance, the vehicle energy storage system may be able to charge to over 95% state of charge within ten minutes. In some embodiments of the invention, a vehicle energy storage system may be able to charge to over 65% state of charge, over 70% state of charge, over 75% state of charge, over 80% state of charge, over 85% state of charge, over 90% state of charge, or over 95% state of charge within ten minutes, nine minutes, seven minutes, five minutes, three minutes, one minute, 30 seconds, or 15 seconds.

In some embodiments, a vehicle, such as a heavy-duty vehicle, may travel a predetermined route, and stop at predetermined points for recharging. See, e.g., U.S. Pat. No. 3,955,657, which is hereby incorporated by reference in its entirety.

The vehicle 110 may have a vehicle charging interface 132 which may be capable of making electrical contact with the charging station 100. The vehicle charging interface may include a conductive material, which may include any of the conductive materials discussed elsewhere herein. In some embodiments, the vehicle charging interface may be provided at the top of the vehicle, while in other embodiments, it may be provided on a side or bottom of the vehicle. The vehicle charging interface may be electrically connected to a vehicle energy storage system 130. They may be connected via an electrical connection of the vehicle. The electrical connector may be formed of a conductive material. In some embodiments, the vehicle charging interface may include a positive and negative electrode. In some embodiments, the electrical connection may include separate electrical connectors for the positive and negative electrodes to the vehicle energy storage system. The positive and negative electrodes may be electrically insulated and/or isolated from one another.

The vehicle 110 may include one or more signal emitter 134. The signal emitter may provide a signal from the vehicle to a signal receiver 126 at the charging station 100. Any type of signal may be provided from the vehicle to the charging station. In some instances, a unidirectional signal may be provided from the vehicle to the charging station. Alternatively, a signal may be provided from the charging station to the vehicle, and/or a two-way communication may be established between the vehicle and charging station. Thus, a signal emitter 134 and a signal receiver 126 may be able to both emit and receive signals. Preferably, the signal may be transmitted wirelessly between the vehicle and charging station. Examples of wireless signals may include, but are not limited to, radio-frequency (e.g., RFID) signals, Wifi, Bluetooth, control-area-network (CAN) messages, or any other form of communication. A signal between the vehicle and charging station may be received when the vehicle and charging station are within some proximity to one another. For example, the signal may be received when they are about ½ mile, ¼ mile, ⅛ mile, 100 meters, 50 meters, 40 meters, 30 meters, 25 meter, 20 meters, 15 meters, 10 meters, 5 meters, 3 meters, or 1 meter of one another.

The signal may include information about the vehicle's location or position relative to the charging station, the vehicle's orientation, the vehicle's identification, the state of charge of a vehicle energy storage system, or any other information.

An aspect of the invention may provide automatic detection of the vehicle as it nears charging station and recognition of which vehicle is entering which particular charging station. In some embodiments, the detection of the vehicle as it nears and/or the identification of the vehicle may be provided via one or more signal that may be exchanged between the vehicle and the charging station. In some embodiments, such identification may be provided using RFID.

An RFID reader may read a tag located on incoming bus at it enters charger station. The RFID reader may be a signal receiver on a charging station, and the tag may be a signal emitter on a vehicle. The read tag ID may be communicated to the charge station controller by means of digital outputs activated as a binary number (example: bus tag ID 4 is output as 0100). This binary number may be interpreted by the charge station controller and broadcast over CAN. This eliminates the need to have an additional computer system to interpret the output of the RFID reader.

In some embodiments, each vehicle may have a unique tag ID. This may allow the charging station to identify and/or track specific vehicles. For example, each bus in a fleet of buses may have a unique tag ID. The tag ID may or may not be provided in binary. Alternatively, one or more vehicles may have the same tag ID. In some embodiments, the tag ID may denote a group of vehicles, or category of vehicles. For example, all buses having a particular configuration may have a particular tag ID, while another set of vehicles with different characteristics may have another tag ID. The tag ID may be provided with sufficient specificity to determine how a charging station may react to the vehicle. For example, a first vehicle category may have a first set of dimensions that may require the charging station to accommodate the first set of dimensions, while a second vehicle category may have a second set of dimensions that may require the charging station to assume a different configuration to accommodate the second set of dimensions. In some embodiments, a plurality of tag IDs may be provided (e.g., a tag ID for a specific vehicle and a tag ID for a type of vehicle). For example, the tag ID for a specific vehicle in a group of vehicles may be used to determine which vehicle may communicate at this time over a wireless link. Subsequent information can be used to communicate from the controller in the vehicle to the controller in the charge station.

A controller area network (CAN) communication between the vehicle and the charge station may be provided via a wireless communication link (e.g., Bluetooth or Wifi link). If the approaching vehicle is detected to be a non-battery electric vehicle, no action may automatically be taken. For example, if a vehicle is not meant to be charged at the charging station, the vehicle may be permitted to pass through or pass by the charging station without engaging with the charging station. In another example, if the vehicle is configured to be able to interface with the charging station, but it is detected that charging is not desired at that point in time, the vehicle may be permitted to pass through or pass by the charging station without engaging the charging station.

If the approaching vehicle is detected to be a vehicle that may interface with the charging station, and/or to be at a state of charge where it may be desirable to charge the vehicle, the charging station, then charging procedures may be initiated. In some embodiments, each vehicle may recognize its own broadcast ID (e.g., from RFID ID CAN message sent from charge station) upon entering a particular charge station and may automatically begin to transmit proper response CAN messages required for docking and charging at that particular charger station. The incoming vehicle may begin communicating with a specific charger upon seeing its ID broadcast by the charging station.

In some embodiments, a charging station may have one charging connection. Alternatively, a charging station may have a plurality of charging connections. When a plurality of charging stations are provided, a vehicle may be directed to the appropriate charging connection by seeing its ID broadcast at the charging station near the correct charging connection. Alternatively, the operator may also select any unoccupied charge station and the system will accept the operator's input to begin the docking process with no specific interaction required to force the selection.

As a vehicle approaches the charging station, there may be some gentle speed limiting of vehicle in preparation for automatically stopping in the proper location to mate with the charger.

Precise calculation of vehicle position with respect to charger docking position may be provided through the use of distance integration using very accurate measurement of drive axle rotation. For example, fractional (e.g., resolution of $1/64$, $1/32$, $1/16$, $1/8$, $1/4$, $1/2$ of a revolution) measurement of motor revolution x known distance per revolution=precise distance traveled. This may be made even more accurate by using known-distance feature points on the vehicle to adapt the rotation-to-linear distance calculation. This may be combined with feedback from the charger about when the vehicle passes a certain point (from a sensor 128 on the charge station) thus yielding position with respect to the charger. Any other technique may be provided to provide or calculate a relative position between the vehicle and the charger. Various sensors may be provided in proximity to the charger, which may include but are not limited to, weight sensors, light sensors, motion sensors, temperature sensors, magnetic field sensors, gravity sensors, vibration sensors, pressure sensors, electrical field sensors, sound sensors, optical sensors, or sensors that may detect other physical aspects.

In some implementations, vehicle position verification using topographic "mapping" of the top of the vehicle may be provided. Similarly, vehicle position verification or mapping of the vehicle may be provided from the bottom of the vehicle, side of the vehicle, or along any orientation of the vehicle. Vertical distance to specific, known features on the roof of the vehicle may be measured using a linear distance sensor mounted above, below, or on the side of the vehicle. Measurements may be matched to known dimensions on the roof to ensure accurate location of vehicle, both fore-aft and left-right. This feature may ensure the docking arm is brought down in the correct location to mate with the vehicle. In addition, this feature may allow the rejection of other, non battery electric vehicles.

Automatic stoppage of vehicle in proper location to dock with charger may be provided. In some embodiments, the automatic stopping may occur via application of on-board regenerative braking. For example, a signal may be provided from the charging station to the vehicle in order to instruct the vehicle to engage the brakes. The signal may be provided to a vehicle controller which may provide signals to driving mechanisms of the vehicle (e.g., brakes, motor, steering). In some instances, there may be automatically controlled forward movement of vehicle to fully seat the charger. Similarly, signals may be provided between the charging station and the vehicle to inform the vehicle to move forward in a particular manner. The signal may cause a motor speed to be controlled, and thereby a vehicle speed to be controlled. For example, the signal may inform a motor to slow down, thereby causing the vehicle to slow down.

In some embodiments, such controls may be similar to automatic docking of the vehicle with the charger. The driving controls of the vehicle may be engaged based on signals between the vehicle and charging station, and the direction and/or speed of the vehicle may be controlled to bring the vehicle to a desired position and/or orientation. Such control signal may originate from a charging station controller and/or vehicle controller. In some embodiments, a driver may or may not be able to manually override the vehicle control. In some embodiments, normal operation of brake and accelerator pedals is retained so that driver can stop or drive away at any time if required in the event of an emergency. In some embodiments, components or features of the charging station may move to assist with the engagement between the vehicle and the charger. For example, a driver may bring a vehicle roughly to a desired location, and one or more features of the charging station may be adjusted to accommodate the vehicle.

CAN message arbitration may allow multiple vehicles to use the same charge station at the same time. For example, if multiple signals are provided between multiple vehicles and the same charge station, the CAN may be able to track which signals are applicable to which vehicles. In some embodiments, the tag ID of each vehicle may be provided with each of the emitted signals, so relayed instructions may be tracked to the proper vehicle.

Drivers LCD screen displays information about docking procedure and is used to give any required instructions or communicate faults.

In some embodiments, one or more charge station control system inputs may be provided. Such inputs may be provided from the vehicle, or from the charging station. Some examples of inputs that may be provided may include, but are not limited to, charge arm up position, charge arm down position, current passing brushes position, neutral brush position, charge head landed on vehicle position, charge head over-temperature, individual (10) brush currents, air supply pressure, RFID Tag ID from RFID reader, ultrasonic linear distance measurement, CAN messages from bus (e.g., bus readiness for charge status, charge arm commands, battery charging requirements), or CAN message from chargers (e.g., charger readiness status, instant charge voltage, current and power, cumulative energy delivered).

Accordingly, one or more charge station control system outputs may be provided to facilitate the charge connection. For a pneumatic system, such outputs may include, but are not limited to, charge arm down solenoid, charge arm up solenoid, extend current passing brushes solenoid, extend neutral brush solenoid, or CAN messages (e.g., RFID Bus ID, position of arm status, position of brushes status, ultrasonic measurement, and charge station readiness status). Similarly, outputs may be used to drive electric-mechanical, hydraulic, electro-chemical, or any other type of actuators.

In some embodiments, the following automatic charge station docking control system features may be provided. For example, a docking procedure may be tolerant of driver stopping too early (prior to auto stop) or being out of position (left-right) and may instruct driver to reposition or try again. In some embodiments, a driver can stop or exit from docking procedure at any time simply by releasing parking brake or driving away.

A serial or dedicated system status message can terminate process in the event of a failure after a period of time by sending error message to chargers and bus. The period of time may have any value include, but not limited to, 1 ms, 5 ms, 10 ms, 50 ms, 100 ms, 150 ms, 200 ms, 250 ms, 300 ms, 350 ms, 400 ms, 450 ms, 500 ms, 600 ms, 750 ms, 1 second, 1.5 seconds, 2 seconds, 3 seconds, 5 seconds, 10 seconds, 30 seconds, or 1 minute.

The vehicle charging system may include any of the components, features, characteristics, or incorporate any of the operations involved with a vehicle, such as one described in U.S. Patent Publication No. 2010/0025132, which is hereby incorporated by reference in its entirety.

Figure 2:
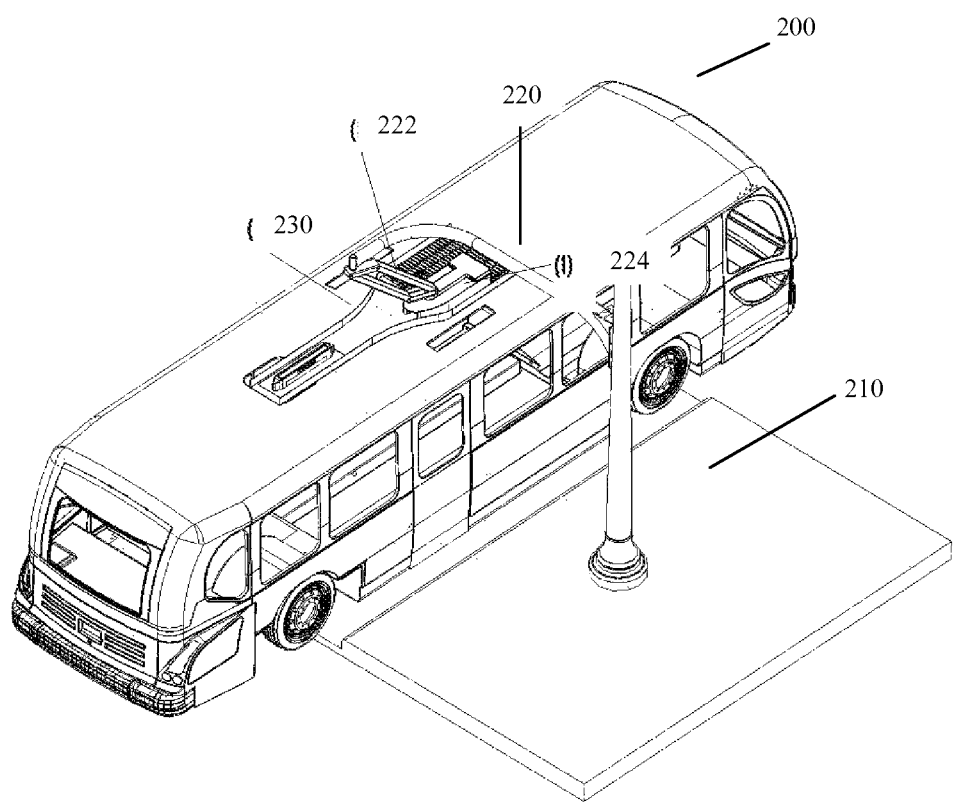
FIG. 2 shows an example of a vehicle engaged with a charging station.

FIG. 2 shows an example of a vehicle 200 engaged with a charging station 210. For example, the vehicle may be beneath an overhanging arm 220 of the charging station. A charging head 224 may be connected to the overhanging arm via an arm connection assembly 222. In some embodiments, the arm connection assembly may be hanging downward and/or at an angle. The charging head may contact a vehicle charging interface 230 on the vehicle. In some embodiments, the vehicle charging interface may include one or more guides that may assist with guiding the charging head to a desired location of the vehicle charging interface.

The vehicle charging interface 230 may electrically contact a charging head 224. This may enable an energy source from the charging station to be electrically connected to the vehicle energy storage system. They may be electrically connected via a fast charging interface. The fast charging interface may enable control over the rate of charge and/or discharge of the vehicle energy storage system by the stationary energy storage system. In some embodiments, a controller may be provided on the charging station or on the vehicle that may control the rate of charge and/or discharge of the vehicle energy storage system. The controller may also permit or not permit charging of the vehicle energy storage system. In some embodiments, the controller may determine whether the vehicle energy storage system is charged, discharged, or if nothing happens.

As previously described, a vehicle may approach a charging station and come into contact with the charging station to establish a charge electrical interface. When the vehicle comes into contact with the charging station, an energy storage system on the vehicle may be charged by a stationary energy storage system of the charging station, an external energy source, or any energy source upstream of the fast charge electrical interface. A stationary energy storage system may be electrically connected to an external energy source via a slow charger.

In some embodiments, multiple stationary energy storage systems may be provided. These stationary energy storage systems may be provided in series, in parallel, or in any combination thereof. Each of the stationary energy storage systems may be charged and/or discharged at the same rate or at different rates. In some embodiments, each stationary energy storage system may be discharged at a faster rate than it is charged.

In accordance with an implementation of the invention, a vehicle may make a mechanical connection (pilot) to the charger head to enable charging. If this mechanical connection is lost, charging can stop after a period of time. In some embodiments, the period of time may have a predetermined value. For example, the period of time may be 0 milliseconds ("ms"), 1 ms, 3 ms, 5 ms, 10 ms, 15 ms, 20 ms, 25 ms, 30 ms, 35 ms, 40 ms, 50 ms, 60 ms, 75 ms, 100 ms, 150 ms, 200 ms, 300 ms, 500 ms, 750 ms, 1 second, 2 seconds, or 5 seconds. Loss of engagement force, such as air pressure, hydraulic pressure, control supply voltage, or any other similar actuation energy (e.g., used to actuate charge head arm and current passing brushes), or detection of any vehicle movement while still docked, may interrupt this pilot signal to stop charging in the shortest time possible (e.g., within 1 ms). Any other fault or error detection may cause the charging to stop.

While a vehicle is charging, one or more contact surfaces (colloquially referred to as "brushes") that may be provided in a charging head 224 may contact a vehicle charging interface 230. Any other electrical connection may be established. When an error or fault is detected, the charging may be stopped before the brushes retract to eliminate or reduce the chance of arcing.

In some embodiments, a vehicle may dock with a charging station after a set of predetermined criteria have been met. Some examples of conditions that may be required to allow docking may include: (1) charge head arm up and out of the way for the vehicle approach (detected home position sensor), (2) air pressure ok for a pneumatic system (pressure transducer), (3) charging brushes retracted in the case of active brush position control (position sensor), and (4) charger status ok (CAN message from charger).

Some implementations may include automatic battery charging process control system features. For example, communication, via wireless CAN to a charger, of a vehicle battery state-of-charge may be provided. In some embodiments a requested charging voltage and/or current may be provided. Brush current sensors may monitor individual brush currents and charging current can be altered (up or down) to maintain highest possible charge rate without forcing too much current through the brushes. The current may be monitored to provide any desired current for a condition. One or more sensor may also determine a brush position (e.g., whether a brush is extended or retracted).

In some embodiments, a total required charge (kWh) may be tailored based on historical knowledge of energy consumption of vehicle. Historical usage, predicted future requirements, and knowledge of electrical charges and rate schedules may be considered and used to adjust both charge rate and vehicle charging frequency in order to minimize or reduce electrical demand charges and make the most efficient use of on-board energy storage. For example, if the next predicted charge of the vehicle is predicted to occur in a short interval and the battery state of charge is sufficiently high, it may be desirable to provide only minimal charging to the vehicle. In another example, if the next charge is predicted to occur after a long interval, it may be desirable to charge the vehicle more.

In some embodiments, before or during charging, a sensor may provide one or more signal to a charging controller. In some instances, the sensor may provide information about one or more error or alert state. For particular error or alert states, the system may react. For example, the system may react by stopping the process and/or altering a parameter of the process. For example, a temperature sensor may determine the temperature within a charging head. Over-temperature in the charging head may immediately stop charging process.

Figure 3:
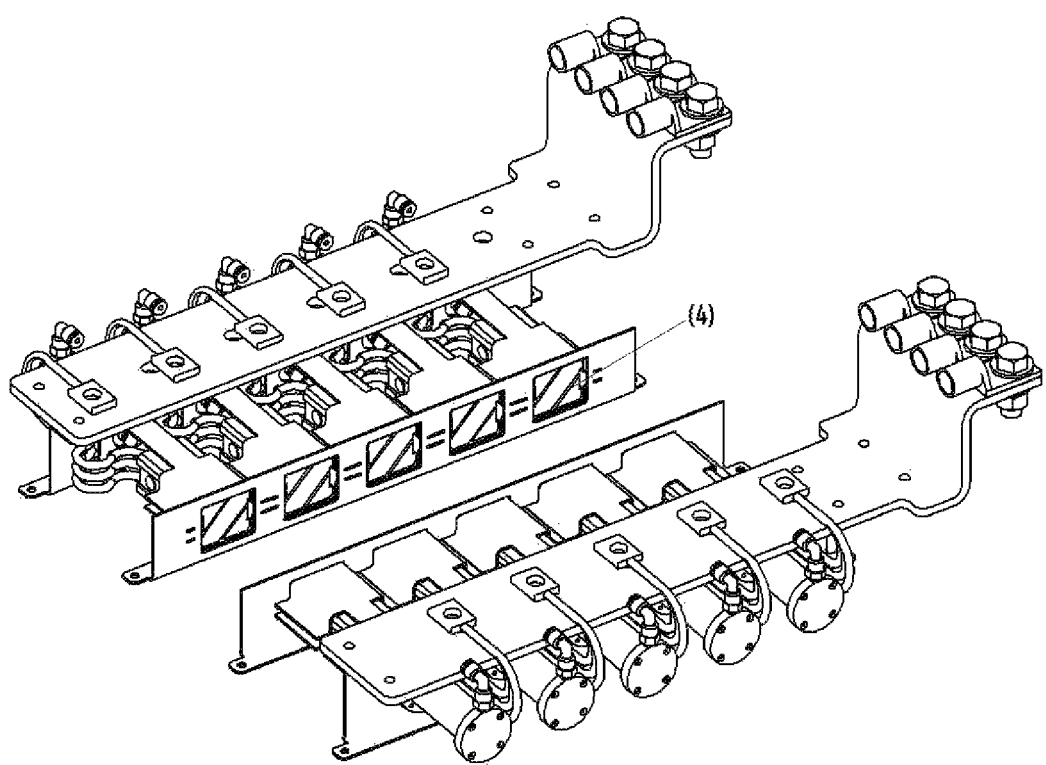
FIG. 3 shows an example of a charging connection of a charging station.

FIG. 3 shows an example of a charging connection of a charging station. Any other types of charging connection may be used. A charging connection may include one or more brushes 300. A brush may provide electrical contact between the charging connection and a vehicle charging interface. A brush may be formed of an electrically conductive material, such as a metal, or any other conductive material discussed elsewhere herein. A brush may have any form or shape, which may include bristles, a bar, a plate, one or more protrusions, one or more grooves, or even and/or uneven surfaces.

A brush may have a first position and a second position. In some embodiments, the first position may be a retracted state and the second position may be an extended state. In some embodiments, a brush in the first position may not make electrical contact with the vehicle, and the brush in the second position may make electrical contact with the vehicle. For example, a brush in a retracted state may not be in electrical communication with a vehicle energy storage system. Similarly, a brush in an extended state may be in electrical communication with the vehicle energy storage system. The brush is not required to have two discrete positions, and may have a different number of discrete positions or have such positions be determined on a continuous scale.

When a vehicle arrives at a charging station and is determined to correctly positioned, the brushes may be actively extended to contact a charging interface of the vehicle. The brushes may also be normally extended with the interface to the vehicle retracting them against springs or other compliant devices. When charging is complete and/or an error is detected, the brushes may be retracted and no longer contact the charging interface of the vehicle. As discussed previously, other charging configurations or interfaces may be used. Other charging configurations or interfaces may provide a first and second position for a part of a charging interface that may establish and break an electrical connection, respectively. Other charging interfaces may have a single brush position that establishes the electrical contact.

A brush may be extended automatically when the vehicle is determined to be in a desired position. A brush may also be extended in response to a signal or request to extend the brushes. Such a request may be directly or indirectly made by a driver of the vehicle, or an operator of a charging station. Similarly, a brush may retract automatically when charging is complete or an error state is detected. A brush may also be retracted in response to a signal or request, which may be made by a driver or operator.

Method

Figures 4, 5:
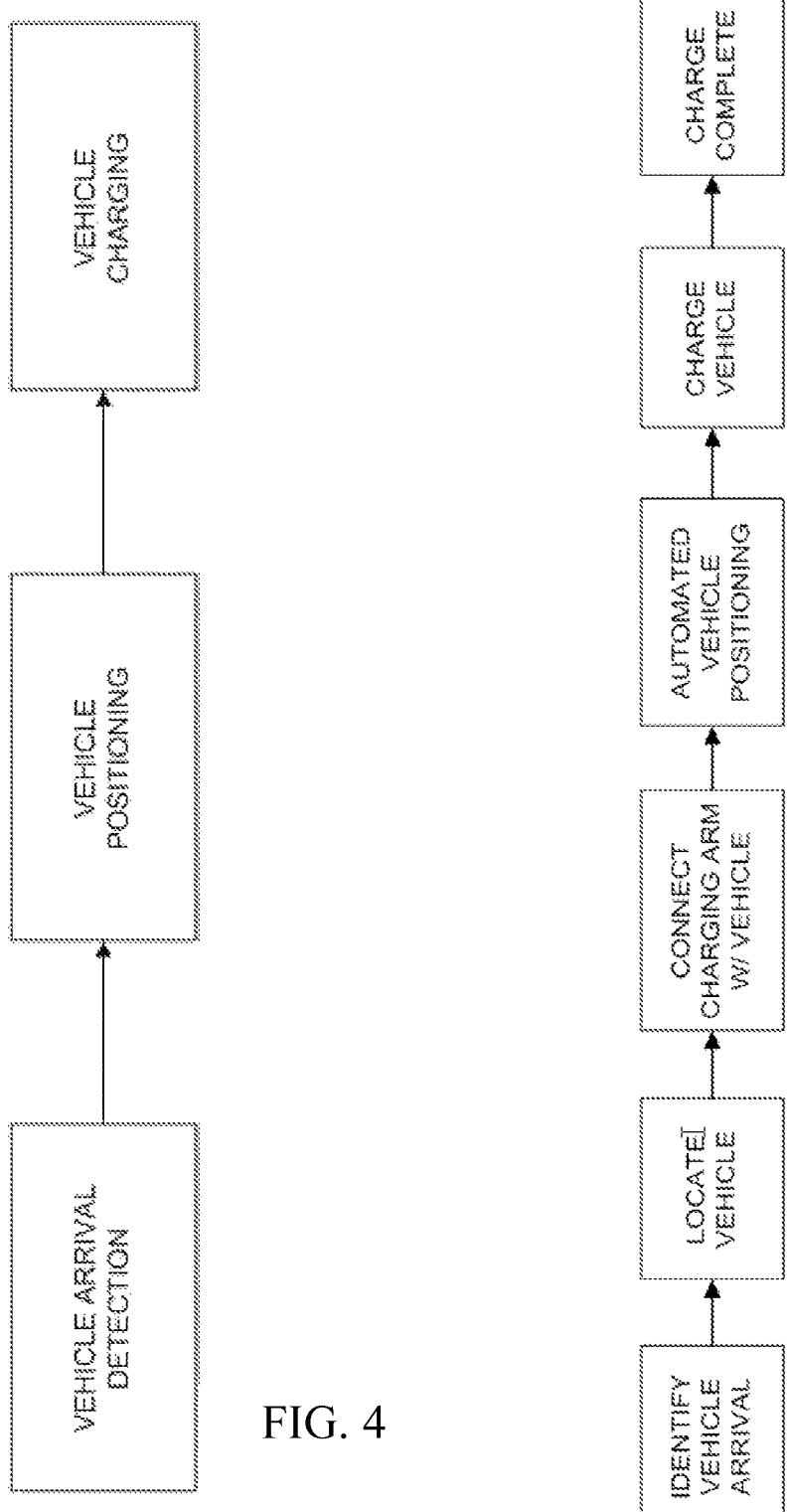
FIG. 4 provides a high level depiction of an automated charging method.
FIG. 5 provides a depiction of an automated charging method in accordance with an embodiment of the invention.

FIG. 4 provides a high level depiction of an automated charging method in accordance with an embodiment of the invention. An automated charging method may include vehicle arrival detection, vehicle positioning, and vehicle charging.

Vehicle arrival detection may identify that a vehicle is approaching a charging station. In some embodiments, the arrival detection may also identify the specific vehicle approaching or the type of vehicle approaching. Vehicle arrival detection may also be able to determine the location or the vehicle and/or the position of the vehicle with respect to the charging station. Other parameters associated with the vehicle, such as the speed and/or direction of the vehicle may be determined. Such vehicle arrival detection may be automatic as the vehicle enters a predetermined proximity of the charging station. The detection may be provided when a signal emitted from the vehicle is received by the charging station.

Vehicle positioning may include automated positioning of the vehicle. In some embodiments, as a vehicle approaching the charging station, the charging station may use information gathered during vehicle arrival detection to control the vehicle drive controls to bring the vehicle into a desired position. For example, the charging station may control the steering, acceleration and/or deceleration of the vehicle. In another example, one or more configuration of the charging station may be altered to accept the vehicle. A charging connection may be made between the vehicle and the charging station.

Vehicle charging may include the actual charging of the vehicle. The rate of charge and/or discharge of a vehicle energy storage system may depend on information gathered during vehicle arrival detection and/or vehicle positioning. For example, the battery state of charge or any historical/predictive information about the vehicle may be used to determine whether to charge the vehicle or how much to charge the vehicle. When the desired amount of charging is complete, the vehicle may be disconnected.

FIG. 5 provides a depiction of an automated charging method in accordance with an embodiment of the invention. The automated charging method may include the operations of identifying a vehicle arrival, locating the vehicle, connecting the charging arm with the vehicle, automatically positioning the vehicle, charging the vehicle, and procedures when charging is complete. In some instances, vehicle arrival detection may include identifying the vehicle arrival and locating the vehicle. Vehicle positioning may include connecting a charging arm with a vehicle and automated vehicle positioning. Vehicle charging may include charging the vehicle and undergoing procedures when charge is complete.

During vehicle arrival identification, the vehicle may approach the charging station. Signals may be exchanged between the charging station and the vehicle, thus allowing communications between the two. A driver may drive the vehicle to an approximate desired location. In some embodiments, one or more guides may be provided that may assist with directing the driver to the desired location. The vehicle may be identified. In some embodiments, the specific vehicle may be identified. Alternatively, the vehicle type may be identified. The vehicle position may be automatically controlled. For example, the speed of the vehicle may be reduced. In some instances, the direction of the bus may also be controlled. The station may determine whether the vehicle is meant to interface with the charging station. If the vehicle is not meant to interface with the charging station (e.g., if the vehicle is not an electric vehicle, or if the vehicle state of charge is sufficient), nothing may occur and the vehicle may pass through or pass by the charging station. If the vehicle is meant to interface with the charging station, the vehicle location may be determined.

Locating the vehicle may involve receiving one or more signal to determine the position of the vehicle relative to the charging station. For example, one or more ultrasonic sensor may be used to detect when the vehicle passes a particular position. The sensor may be able to detect a locating feature of the vehicle. In some embodiments, a controller may determine whether a locating feature was sensed within an appropriate amount of time. If not, the bus may be determined to be out of position and a driver may try to reposition the bus. If the feature is detected within a desired amount of time, the bus may be determined to be in a desired position, and the bus may be automatically stopped.

Connecting the charge arm to the vehicle may occur as the bus is within a desired location relative to the charge station. For example, if a charge arm is overhanging the vehicle, the charge arm may be lowered onto a roof guide of the vehicle. The roof guide may have some tolerance that may enable the charge arm to contact the roof guide even if the bus is not at a very precise position. A controller may determine whether the charge arm is down. If the charge arm is not down, an error may have occurred, and the process may be stopped. If the charge arm is down, the procedure may continue.

Automated vehicle positioning may occur after a charger is connected to the vehicle. The vehicle may automatically be put into a desired location. For example, a vehicle may be automated moved a particular amount within a desired speed limit. The vehicle may be automatically stopped when it is at a desired location. In some instances, the vehicle brakes may automatically be engaged. A controller of the system may determine whether the bus is at the desired location and that the brake is set. If not, then the controller may determine that an error has occurred. If no error is detected, and the vehicle is a passenger vehicle, such as a bus, the movement of the vehicle may be locked and passengers may be allowed off.

Vehicle charging may occur after a vehicle is at a desired position and a connection is established between the charging arm and the vehicle. The charging arm may include one or more brushes, and may extend such brushes to form an electrical contact with the bus. A controller may determine whether the brushes have been extended. If the brushes are not extended, an error may be detected. If only some of the brushes are extended, the procedure may or may not continue. Once the brushes are extended, current flow may begin. One or more sensors may be provided which may check whether the current and temperature are within a desired range. If not, an error may be detected and the charging connection may be broken. If they are within the desired range, charging may continue until complete.

Once charging is complete, one or more operations may be provided. For example, the system may log charge metrics and release the brushes. A controller may determine whether brushes have been successfully released. If they have not, then an error may be detected and the connection between the vehicle and charging station may be broken. If no error is detected, the charge arm may be released and disconnected from the vehicle. For example, a charge arm may be lifted. The controller may detect whether the arm has been successfully lifted. If it has, charging may be complete, and the vehicle may be unlocked (e.g., a brake may be released). The driver may drive the vehicle away when ready.

FIG. 6A-F provides a block diagram for a docking and charging procedure as provided in an embodiment of the invention. FIG. 7A-G provides a table describing the operations for an automatic docking and charging procedure. The features described in the block diagram and table may be used in combination or separately. The diagrams and table provide examples of operations for a docking and charging procedure in accordance with an embodiment of the invention, and any operations described therein may be optional, in a different order, may be exchanged with similar operations, or may have additional operations added thereto.

Figure 6A:
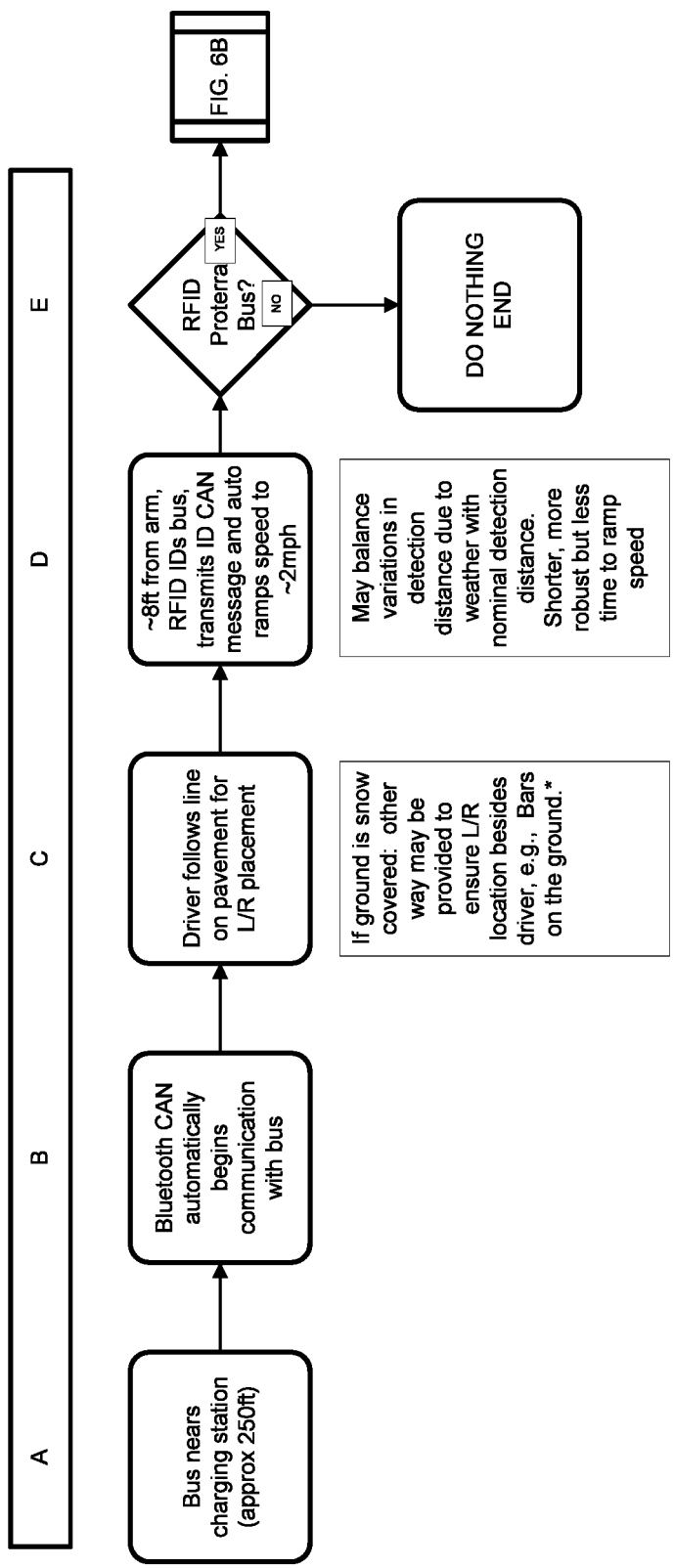
FIG. 6A-6F provides a block diagram for a docking and charging procedure as provided in an embodiment of the invention.

FIGS. 6A and 7A provide an example of operations involved in identifying a vehicle arrival. In one example, the vehicle may be a bus, although any description herein may also apply to any other type of vehicle. A bus may near a charging station, as provided in operation A. In some embodiments, a bus may be near a charging station at a predetermined distance from the charging station. The predetermined distance may be fixed or may vary based on circumstance. In some instances, the predetermined distance may be about 3000 feet or less, 2000 feet or less, 1500 feet or less, 1000 feet or less, 750 feet or less, 500 feet or less, 300 feet or less, 250 feet or less, 200 feet or less, 150 feet or less, 100 feet or less, 50 feet or less, or 10 feet or less. A vehicle controller on the bus may look for one or more signals (e.g., CAN messages from a Bluetooth wireless link). The charging station may be waiting for a signal from the bus. For example, the charging station may be waiting for CAN messages from the bus. The charging station may perform periodic air pressure tests.

As indicated in operation B, signals may be exchanged between the bus and the charging station. For example, Bluetooth CAN may automatically begin communication with the bus. In some embodiments, one bus can be provided per CAN network. Alternatively, multiple buses may communicate over a CAN network, or other network. This may be desirable in situations where a charging station can accommodate multiple vehicles.

When a bus receives a signal, it may start a main routine (e.g., upon receipt of a charging station CAN message). This may set a charger readiness flag on the bus, upon receiving a good communication from the charging station. In some embodiments, a display may be provided, either at the charging station, or within the bus. The display may indicate which charge station to go to, or a status of the station (e.g., charging readiness). The display may also indicate to the driver the speed of the bus (e.g., mph). In some embodiments, a vehicle control system may apply a filter to the charge station CAN messages based on the side of the charger. This may be done using RFID. The display may indicate whether a connection has been made. Preferably, such an indication may be provided as soon as possible. A driver may be trained to stop by themselves if no connection signal is made.

Meanwhile, the charging station may be checking for air pressure or the applicable energizing force (hydraulic pressure or control voltage, for instance), and may check on the status of the charger. For example, the charging station may check for an ok from the charger. It may then send an ok to a charge flag. The charging station may also check on the status from RFID. The charging station may also determine that the charging arm position is up, and check so that any subsequent ultrasonic sensor readings may be accurate.

Operation C indicates that a driver may drive the bus to an approximate desired position. One or more guides may be provided to assist the driver with positioning. For example, a line may be provided on the pavement for left/right placement. Additional types of guides may be used. For example, bars, flags, hanging lines, or other guides may be provided.

In some instances, no control information may be provided for initial left/right placement of the bus. Alternatively, a display may indicate whether the driver should move more toward the left or right. The display may also indicate to the driver to slow down if the driver is going too fast. If the driver moves too fast, the bus may not be charged.

A bus may be identified as indicated in operation D. In some instances, RFID may be used to identify the bus, although any other signal may be used. The bus may be identified at a distance from the charging arm. In some embodiments, the distance may be about 100 feet or less, 50 feet or less 30 feet or less, 10 feet or less, 8 feet or less, 5 feet or less, 3 feet or less, 1 foot or less from the charging arm. An RFID tag on the bus may result in the transmission of a bus ID CAN message. Upon receipt of that ID CAN message the bus may automatically ramp its speed to a desired speed. One example of a desired speed may be about 15 mph or less, 10 mph or less, 8 mph or less, 5 mph or less, 3 mph or less, 2 mph or less, or 1 mph or less. In some embodiments, accommodations may be made to balance variations in distance of detection. Such variations may occur due to weather or other conditions. In some instances, the speed ramping may be affected based on variations in detection distance.

As indicated in operation E, a controller may determine whether the bus is a bus that is intended to interface with the charging station. This may depend on the specific bus ID, or the type of the vehicle. This may or may not take into account the state of charge of the bus and/or any historic/predictive information. If the bus is not meant to interface with the charging station, no operations may be taken. Alternatively, operations not leading to charging the vehicle may be taken.

The bus controls may monitor driver speed and disallow docking if the speed is too high. The bus speed may be provided on a display, whether or not auto control has taken place. A CAN message may be provided indicating whether RFID has detected the bus. A bus controller may ensure that the bus is in first gear, or operating at a desired speed. Upon receipt of the RFID CAN message, vehicle speed limiting may occur. For example, a vehicle speed may be ramped to 3 mph or less, or 2 mph or less, or any other speed discussed elsewhere. The bus controls may wait for a signal from an ultrasonic sensor. In some instances, charging may be disallowed if ride-height is not nominal. In some instances, a tolerance range may be provided for a bus ride height. For example, a height delta of 2 feet or less, 1 feet or less, 6 inches or less, 4 inches or less, 3 inches or less, 2 inches or less, 1 inch or less may be provided. The display may indicate when a bus is at a desired position, and the bus may be stopped.

The charging station control may communicate with the bus. In one example, RFID may come through the Ethernet, to a CAN gateway, or potentially from reader outputs. The charging system controls may communicate with bus controls. In some instances, control decisions may be made by the charging station controls, vehicle bus controls, or both.

Figure 6B:
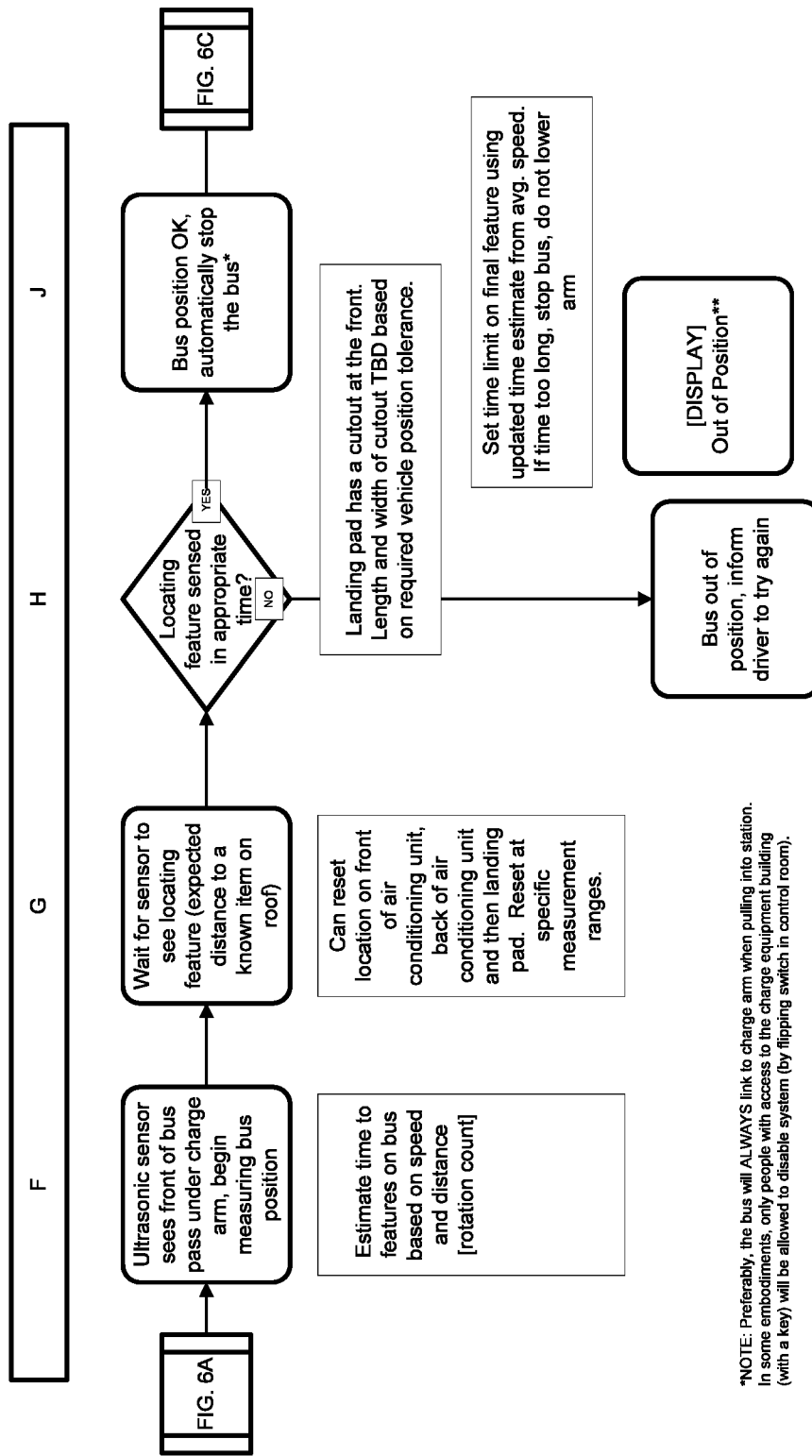

FIGS. 6B and 7B provide an example of operations involved in locating a vehicle. As provided in operation F, a sensor may determine if a bus is at a desired position. For example, an ultrasonic sensor may see the front of a bus pass under a charge arm. Then the sensors may be used to begin measuring bus position. In some embodiments, a bus's subsequent position may be detected using sensors or may be calculated based on data collected about the bus at specified points in time. For example, if a bus' location, speed, and/or direction is known at a particular time, the bus' subsequent positions may be calculated or estimated. Bus wheel rotation count may assist with determining bus location.

In operation G, the system may wait for a sensor to see a locating feature (e.g., expected distance to a known item on a roof). For example, a bus may have a locating feature on a roof or any other part of the bus that may be detected by a sensor. In some instances, one or more locating feature may be provided at the front of the bus, at the front of a roof guide, at a contact plate, at the rear of a roof guide and/or at a rear of the bus. Locating features may or may not be provided at specific measurement ranges. The sensors used to detect a locating feature may be ultrasonic, optical, mechanical, electrical, magnetic, thermal, or may include any other types of sensors described elsewhere herein.

A vehicle controller and/or charging station controller may receive a CAN message containing distance measurement information from an ultrasonic sensor that indicates that the bus has passed under a charging arm. Distance integration may begin. One or more reset points may be provided, which may correspond to one or more locating feature. In one example, distance integration to a reset point 1 (beginning of Air Condition unit) may occur. A watchdog time to reset point 1 may be based on average speed. Reset points may be specific measurements of an ultrasonic sensor. The time to reset point 1 may be stored in a register and checked against bounds. The system may continue integration from the front of the bus if time to reset point 1 is out of bounds. If the time is in bounds, integration to point 1 may be reset. The system may then begin distance integration to reset point 2 (back of Air Condition unit). The system may watchdog time to reset point 2 based on average speed. The time to reset point 2 may be stored in a register and checked against bounds. The time since initial start of integration may be checked as a potential back-up. The system may then wait for a final location point 3 (e.g., portion of charge arm landing ramp that is lower by several inches), and time to this point may be carefully bounded. The left and right location of the bus relative to the charge arm may be verified by a final location point 3 distance measurement that may only be correct if the bus is positioned appropriately both front/rear and left/right. Any number of reset points (e.g., 1 or more, 2 or more, 3 or more, 4 or more, 5 or more, 6 or more, 8 or more, 10 or more, etc.) may be provided at any location of the bus. The various reset positions and timing may be provided in accordance with an embodiment of the invention.

The charging station may check for a proper signal from ultrasonic sensors. The signal may preferably be within a window allowing for ride height differences.

At operation H, a controller may determine whether a locating feature was sensed in appropriate time. In one example, the appropriate time may be about 1 minute or less, 30 seconds, or less, 20 seconds or less, 15 seconds or less, 10 seconds or less, 8 seconds or less, 5 seconds, or less, 3 seconds or less, 1 second or less, 500 ms or less, 250 ms or less, 100 ms or less, or 50 ms or less, or any other time frame discussed elsewhere herein. If the locating feature is not sensed, the bus may be out of position, and the driver may be informed to try again. If the locating feature is sensed in the required amount of time, the bus position may be ok.

If a final point measurement and time are both within the desired range, a bus controller may begin a bus stop routine. The doors may be disabled unless a parking brake is set, in case the bus driver stop the bus too soon. If a bus driver does stop a bus too soon, a display may indicate as such. The display may also inform the driver that to charge the bus, the driver may need to release the brake and pull ahead slowly when safe. The bus may automatically stop when it is in the correct position.

Operation J indicates that when a bus position is within a desired range, the bus may be automatically stopped. A bus controller may ramp the bus speed to zero using regenerative braking. This may be done in as short a time as comfortably possible. The controller may wait for the bus to reach zero speed. Then the bus may be shifted to neutral and a brake may be engaged. For example, the controller may apply rear door brake interlock. A display may indicate that the bus is waiting for the charge arm to lower. The bus may move ahead automatically.

Figure 6C:
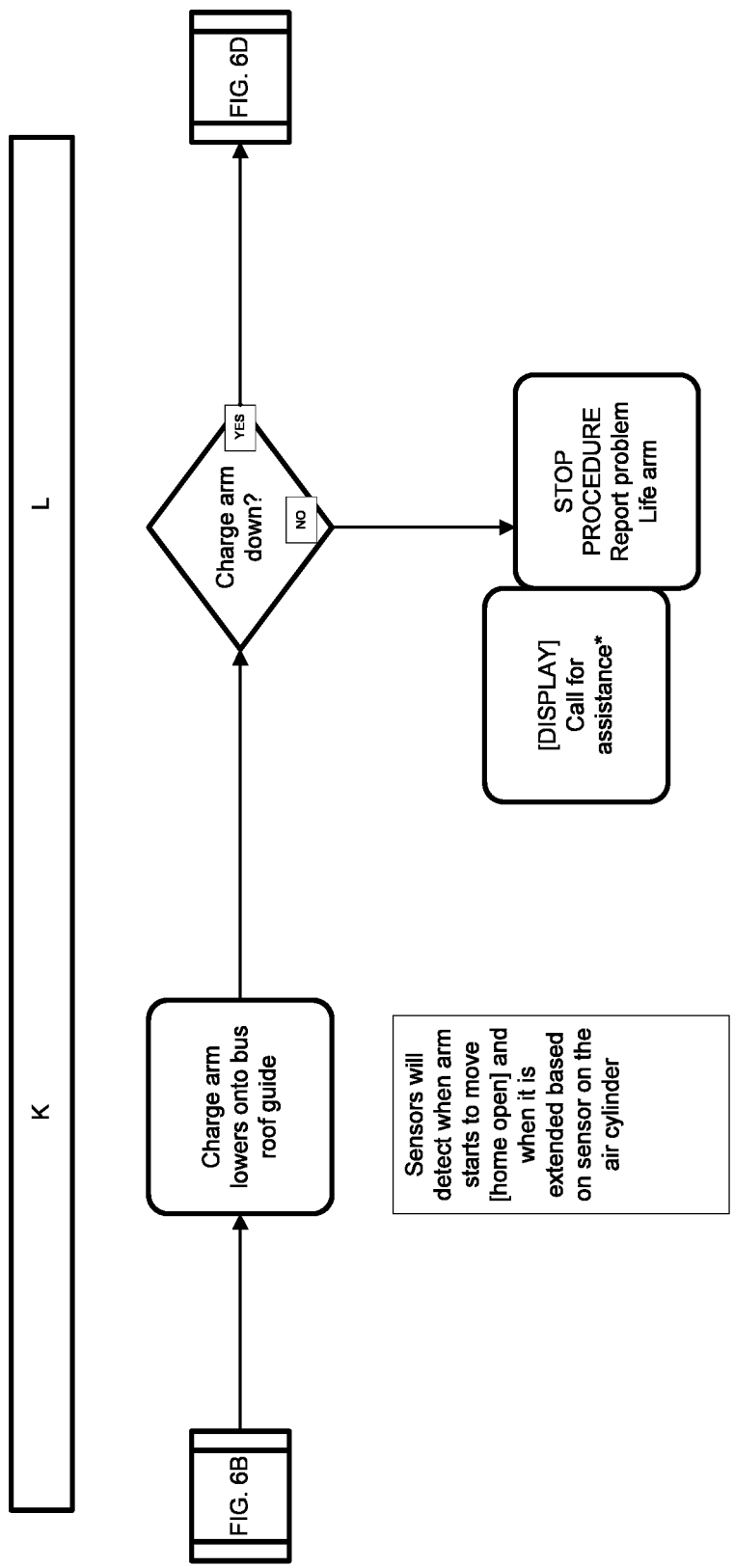

FIGS. 6C and 7C provide an example of operations involved in connecting a charging arm with a vehicle. As provided in operation K, a charge arm may be lowered onto a bus roof guide. The bus roof guide may have some tolerance build in so that the charge arm may engage with the roof guide even if the bus is not at a precise location. Sensors may detect when the charge arm starts to move, and when it is extended. In some embodiments, the sensors may be able to detect this based on a sensor in an air cylinder of the charge arm. Any other sensors may be used to determine the position of a charge arm.

A bus or charging station controller may be used to begin an arm-lowering sub-routine. The bus controller may send a signal to the charging station that the bus is in position. This may cause the arm to be lowered. The arm movement may be checked. For example, the arm movement may be checked by loss of home position. The system may also check whether the arm cylinder is down and then wait for head down indication (ex. Microswitches). A charging station controller may actuate an arm down solenoid. Any other type of actuator may be used to cause the arm to move. For example, motors, solenoids, linear actuators, pneumatic actuators, hydraulic actuators, electric actuators, piezoelectric actuators, or magnets may be used. The charging station may send the arm moving. The arm may move down.

Operation L may check whether the charge arm is down. For example, two switches may close when charge arm is on a landing pad. If it lands short or to the side, both switches may not make contact. If the arm is detected to not be down, an error CAN message may be provided. This may stop the procedure and a problem may be reported. If the arm is partially down, the arm may be lifted. A display may indicate to the driver to call for assistance. Once all switches are good, a bus controller may begin a final bus movement subroutine.

Figure 6D:
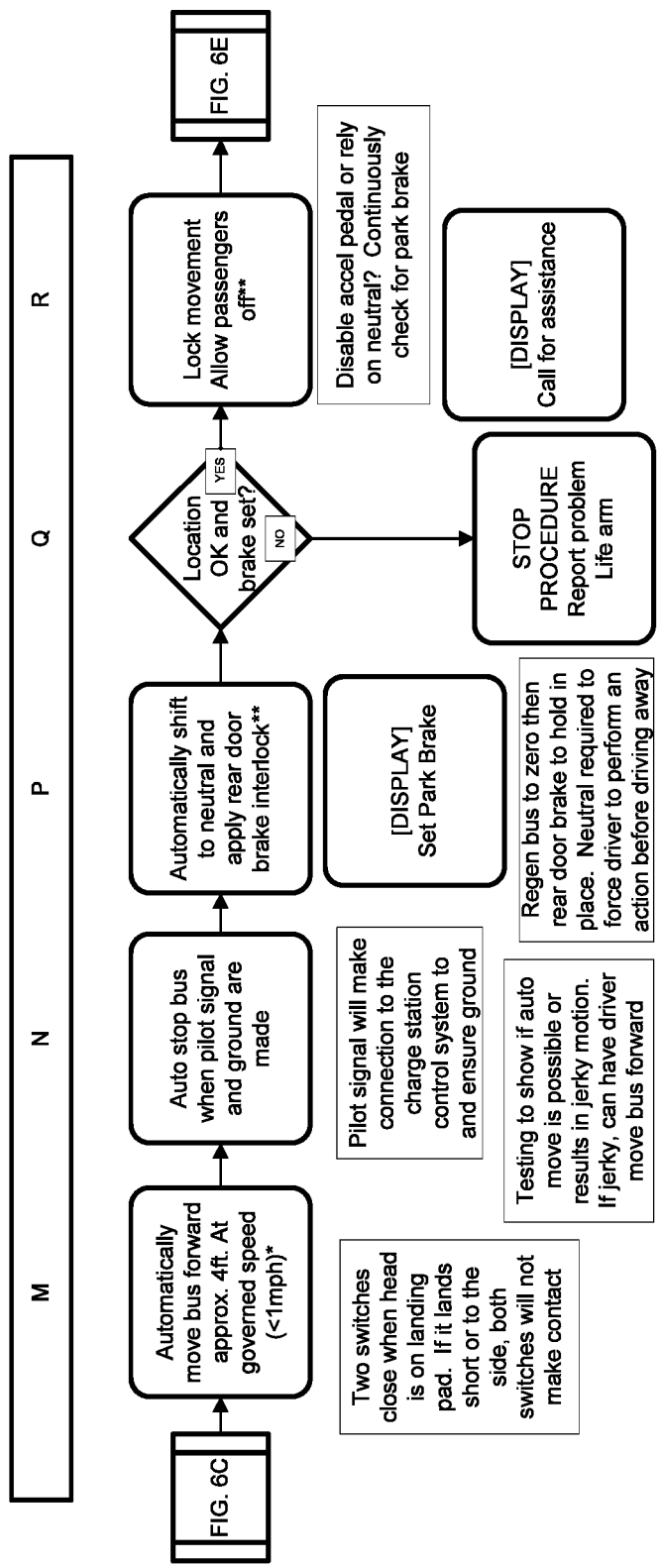

FIGS. 6D and 7D provide an example of operations involved in automated vehicle positioning. In operation M, a bus drive mechanism may be automatically controlled to place bus in a desired position. For example, the bus may be automatically moved forward at a governed speed. In some instances, the bus may be moved forward about 20 feet, 15 feet, 12 feet, 10 feet, 7 feet, 4 feet, 3 feet, 1 foot, or any other distance described elsewhere herein. In some embodiments, the governed speed may be about 10 mph or less, 8 mph or less, 5 mph or less, 3 mph or less, 2 mph or less, 1 mph or less, or any other speed described elsewhere herein. The bus may move forward automatically, or the driver may be instructed to move the bus ahead and then it may automatically stop once a charge head is engaged with the bus. In some embodiments, one or more switches may be provided to make contact when a bus is at a desired location.

A bus controller may indicate on a display that the bus will move forward automatically and then stop to charge. The bus may also inform the driver to release a brake pedal. Alternatively, the brake pedal may automatically be released. In some embodiments, a bus controller may check that the driver is off the pedal. The bus controller may send a motor torque signal as low as possible to move the bus slowly and smoothly. This may begin distance integration as soon as the bus moves to use a watchdog. The bus controller may wait for a pilot signal to indicate the charge head is in the correct position.

Operation N provides that a bus may be automatically stopped when a pilot signal and ground are made. This may indicate that the bus is at a desired position. In some instances, a bus controller may automatically stop the bus once it is in position using the same procedure as described in operation J. Alternatively, a different procedure may be used.

Operation P may allow the bus to be automatically shifted to neutral and a brake may be automatically engaged. The brake may be a rear door brake interlock. Automatic stops may be accomplished by regenerative braking or by controlling a motor to zero rpm. Once a bus is in final position, a rear door brake interlock may be automatically applied (to prevent the bus from rolling), and the bus may be shifted to neutral. In some instances, a display may inform a driver to set a parking brake. The driver may be instructed to set a parking brake, or the parking brake may be automatically engaged. Once the desired brakes are engaged, the doors may be opened and charging may start. If the driver wants to drive away prior to setting the parking brake, the driver may engage the brake and shift to drive. This may release the rear door brake interlock. The doors may be prevented from opening to discourage this under normal circumstances. If the parking brake had been set and charging started, releasing the parking brake may be sufficient to stop charging. Releasing the parking brake during charging may be considered an abnormal condition.

A bus controller may apply regenerative braking to reduce the bus speed to zero. The bus controller may also automatically shift the transmission to neutral. Alternatively, a driver may be instructed to shift the transmission to neutral. The bus controller may apply a rear brake interlock. A display may indicate to the driver to set a parking brake to allow bus doors to open and the bus to charge.

Operation Q may allow a controller to check if the bus location is within a desired range, and whether the desired brakes are set. If this condition is not met, the procedure may be stopped. A problem may be reported and/or the arm may be lifted. The bus controller may check for a parking break.

In accordance with operation R, bus movement may be locked to allow passengers off. In some embodiments, an acceleration pedal may be disabled. The system may continuously check for a parking brake. Once the bus movement is locked, the doors may be allowed to open, and a display may indicate that the bus is charging. A charging station controller may check for a pilot signal from a charger prior to allowing charging.

Figure 6E:
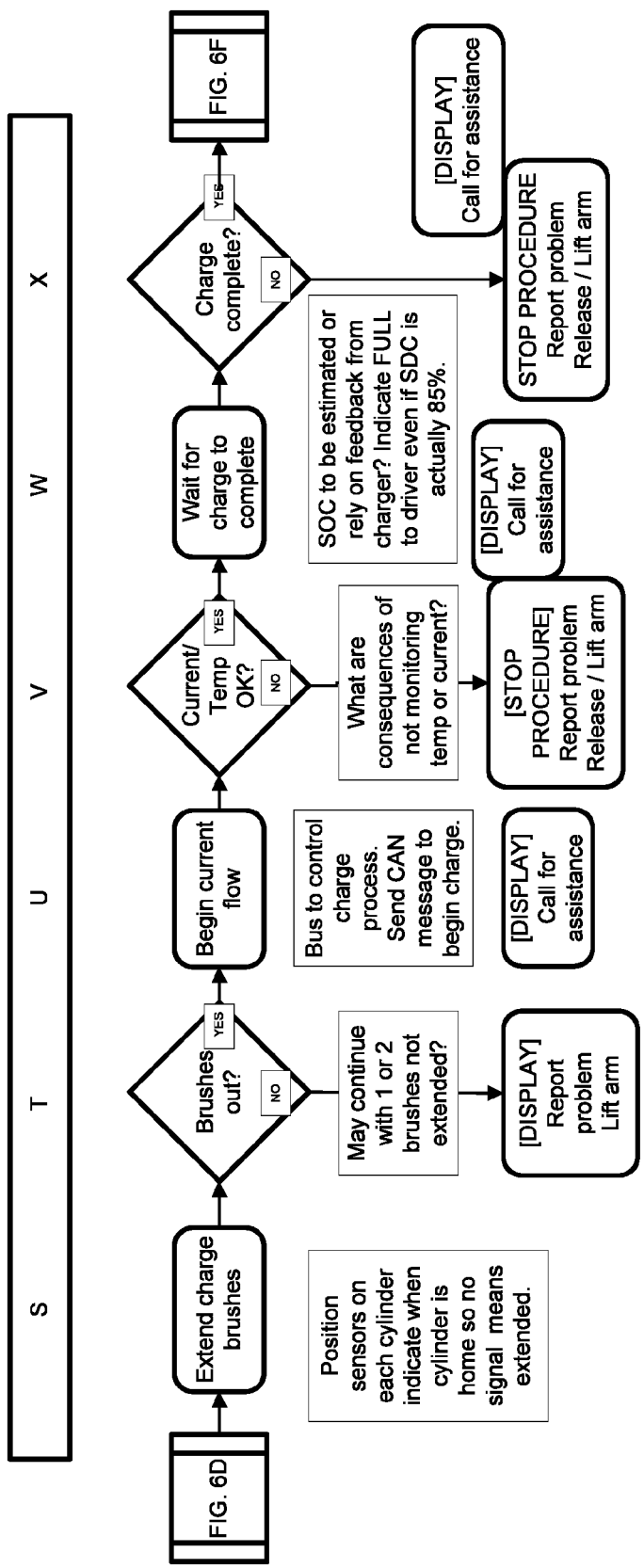

FIGS. 6E and 7E provide an example of operations involved in charging a vehicle. As indicated in operation S, during charging, charge brushes may be extended from a charging arm of a charging station. Position sensors may be provided at each cylinder to indicate when a cylinder is home (not extended).

A bus controller may begin a charging sub-routine during charging. It may send a signal to extend a ground brush. It may wait for confirmation or a signal that a ground brush has been extended. It may send an AC signal or tone to ensure that the ground is connected. If the ground is connected, the controller may signal the charge brushes to extend. The charging station controller may provide a signal to extend a grounding brush air cylinder. The charging station controller may also extend charging brush air cylinders.

Operation T verifies whether the brushes are out. If they are not all out, but some brushes are out, the procedure may continue with some of the brushes not extended. Continued operation may be at a reduced performance in proportion to number of brushes not extended. If too many of the brushes are not out, an error may be indicated. A display may indicate to report the problem. The charging arm may be lifted.

A bus controller may wait for all brushes to extend. In some embodiments, there may be 1 or more, 2 or more, 3 or more, 4 or more, 6 or more, 8 or more, 10 or more, 12 or more, 16 or more, 20 or more, 30 or more, 40 or more, or 50 or more brushes. The controller may wait for all brushes to extend, or may wait for a predetermined number of brushes to extend.

As provided in operation U, current flow may be initiated. In some embodiments, the bus may control the charge process. The bus may send a CAN message to the charging station to begin the charge. Alternatively, the charging station controller may control the charge process. A bus controller may send a signal to the charging station that it is ok to start charging. The charger may report time to charge.

A controller may determine whether the charging current or temperature falls within a desired range in operation V. For example, a desired level of charging may be provided based on the bus battery state of charge, and/or historic/predictive factors. A desired charge characteristic (e.g., voltage, current amplitude, pulsing, duration, etc.) may have a predetermined range. Similarly, a temperature may have a predetermined range. The current and temperature may be monitored periodically or continuously. If they fall outside the desired ranges, a problem may be reported. The charging arm may be released and/or lifted.

Operation W may be to wait for the charge to complete. The charge may be applied for a predetermined amount of time. Alternatively, a vehicle state of charge may be monitored, and the charge may occur until the vehicle battery has reached a desired state of charge. In some instances, a display may indicate that the status is charging. The display may also indicate the time left to complete charging or the percent charging that has been completed. Any other status updated may be provided on a display while the bus is charging. A bus controller may stop current flow if there is a loss of pilot, overtemperature indication, based on a report back from a battery management system, or a report back from a charger. A charging station may continuously monitor temperature switches. The charging station may also close distribution box contactors.

In operation X, the system may determine when charge is complete, or that a desired state of charge has been obtained. In some embodiments, the desired state of charge may be when a vehicle battery has been fully charged. Alternatively, the desired state of charge may be any value based on historic/predictive data for the vehicle. If the charge is not complete after a predetermined amount of time, an error may be reported. The charging arm may be released and/or lifted. A display may indicate to call for assistance.

Figure 6F:
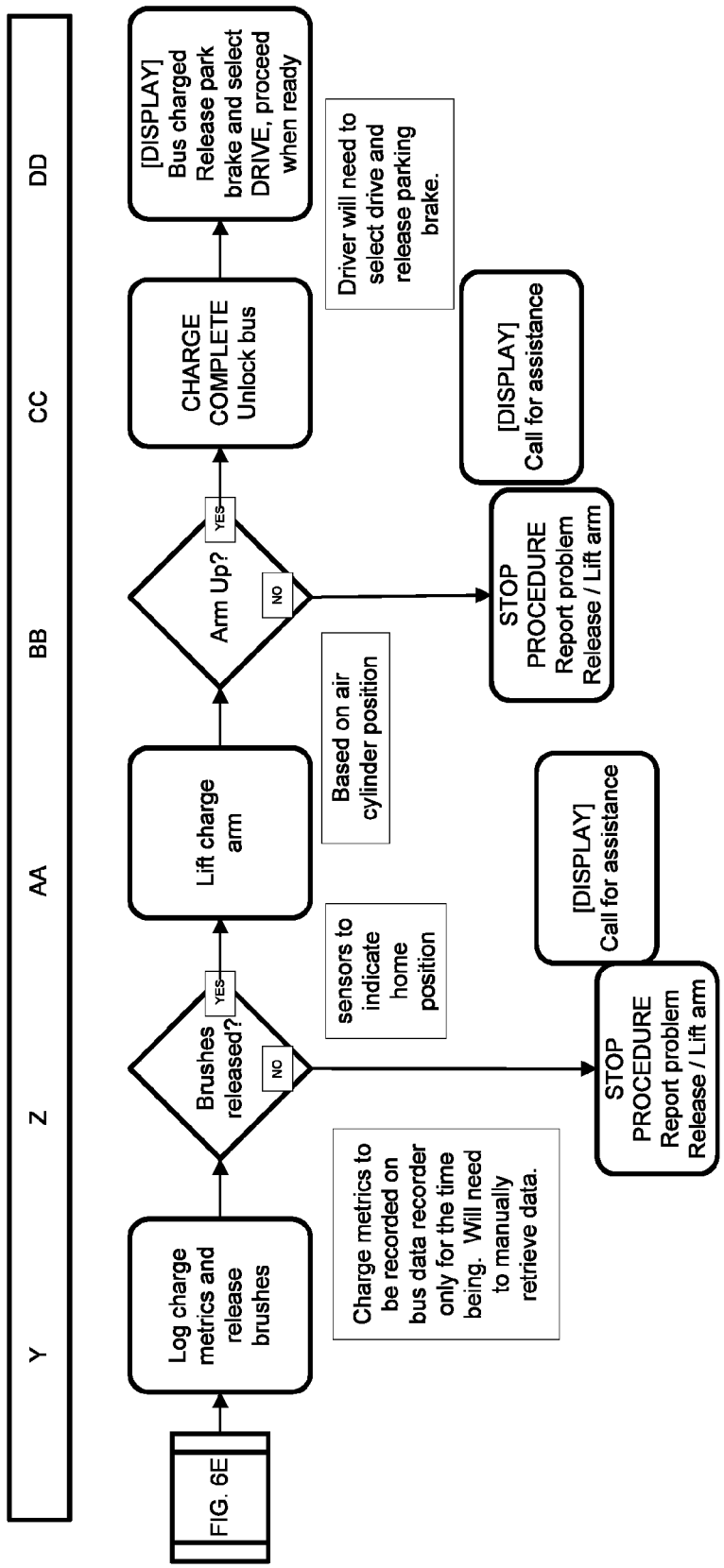

FIGS. 6F and 7F provide an example of operations involved when charging is complete. In operation Y, charge metrics may be logged. For example, the initial battery state of charge, the charging parameters (e.g., voltage, current amplitude, duration of charging, total power, faults, time, peak current, etc.), battery end state of charge, may be logged. In some instances, the bus controller may be logging the charge metrics when the charge is complete. In some instances, the charge metrics may be recorded during charge. The charge metrics may be recorded on a bus data recorder. In some embodiments, they may be recorded only for the time being. Alternatively, they may be recorded for an extended amount of time. In some instances, the data may be manually retrieved. Alternatively, the data may be accessible and may be automatically retrieved.

In operation Z, a controller may determine whether brushes have been released. If the brushes have not been released the procedure may be stopped. A problem may be reported. If possible, the charging arm may be released and/or lifted. A display may be provided to call for assistance.

A bus controller may begin a charge done sub-routine. Charging may be stopped, and a signal may be provided to release brushes. The controller may wait for all brushes to be released and returned to a retracted (e.g., home) position. A signal may be provided to release ground. In some instances, the controller may wait for the ground to get home. Confirmation may be made that the brushes and ground have been returned to a home position. A signal may be provided to raise the charge arm.

In response to a signal from the bus controller, the charge station may raise the charging arm. In some instances, the charge station controller may ensure that the arm has returned to a home position for the next time.

In accordance with operation AA, the charge arm may be lifted. A bus controller may wait for a loss of head micro switches (charge head not down) before allowing a driver to move.

In operation BB, the charge arm position may be verified. For example, based on air cylinder position, it may be determined whether a charging arm is up. If not, the procedure may be stopped and/or a problem may be reported. If the arm is successfully up, the bus controller may release a rear-door brake interlock and allow movement.

As indicated in operation CC, when charging is complete the bus may be unlocked. A display may indicate to a driver that the charge is complete, and to release a parking brake and select a gear to drive away. As indicated in operation DD, when the bus is charged, the parking brake may be released and the driver may select a drive option. The driver may proceed when ready. In some instances, a display may indicate a battery state of charge or a fuel gauge. For example, a full fuel gauge may be displayed.

As previously mentioned any of the operations herein may be provided by one or more controller of the system. One or more bus controller or charging station controller may be provided. Any of the functions, which may be indicated to be performed by a bus controller or charging station controller may be performed by any other controller. In some embodiments, tangible computer readable media may be provided to enable the functions to be carried out. The computer readable media may include logic, code, instructions to carry out such operations.

FIG. 7G provides an example of operations involved in relation to different faults within the system. When a fault is detected, a fault sub-routine may be run. The charger may be signaled to stop. Brushes may be released. The rear-door brake interlock may be released. During a fault, bus movement may be allowed if the driver uses pedals and releases a brake. A signal may be provided to lift the arm up. Any fault code may be logged. A display may be provided indicating that charging has stopped and to contact support. The display may include a number or normal trouble routine.

A display may be provided to a driver and/or operator of a charging station. The display may be provided at a charging station or on a vehicle. The display may be provided on a display device, such as a screen. Some examples of display devices may include whether a particular charging station is ready or not ready (e.g., charging station 1 is ready, charging station 2 is not ready, etc.). The display may also indicate whether communication has been established. The display may also include driving instructions (e.g., please drive slow to 5 mph) before the charge station or auto charging may not take place. Alternatively, the system may take control without providing such instructions. In some instances, a display may indicate the speed of the vehicle (e.g., x.x mph). The speed may be precise. If the speed is acceptable, charging may take place, and the display may indicate as such. In some embodiments, the display may indicate that the driver ought to be prepared to stop if required. The display may also instruct a driver to drive in a manner aligned with a driving guide. In some instances, if the driver strays too much to the left or right a warning may be provided. If the bus is moving too quickly, the display may indicate to the driver to slow down. The display may warn the driver that the vehicle may not charge if it comes in too quickly.

The display may provide instructions for charging the bus. For example, the display may inform the user that to charge the bus, the brake may be released and to pull ahead slowly when safe. The bus may automatically stop. The display may indicate as a driver approaches the initial stop position, and the bus may automatically stop, and to release the brake if safe. The display may also indicate that while waiting for the charge arm to lower, the bus may move ahead automatically to charge, and to release brake if safe. Once a bus is connected to a charger, the display may indicate as such, and instruct the driver to set a parking brake to start the charge and allow the vehicle doors to open. While the bus is charging, the display may indicate the battery state of charge or how much time left to charge. A fault may be indicated if the bus is not charged, and to contact maintenance. When charging is complete, instructions may be provided to select drive and release the parking brake when ready. If the bus is out of position, the display may indicate to drive around and try again (e.g., not back up). In some instances, password access may be granted. A diagnostic screen may be shown indicating battery specifics and fault codes.

Figure 8A:
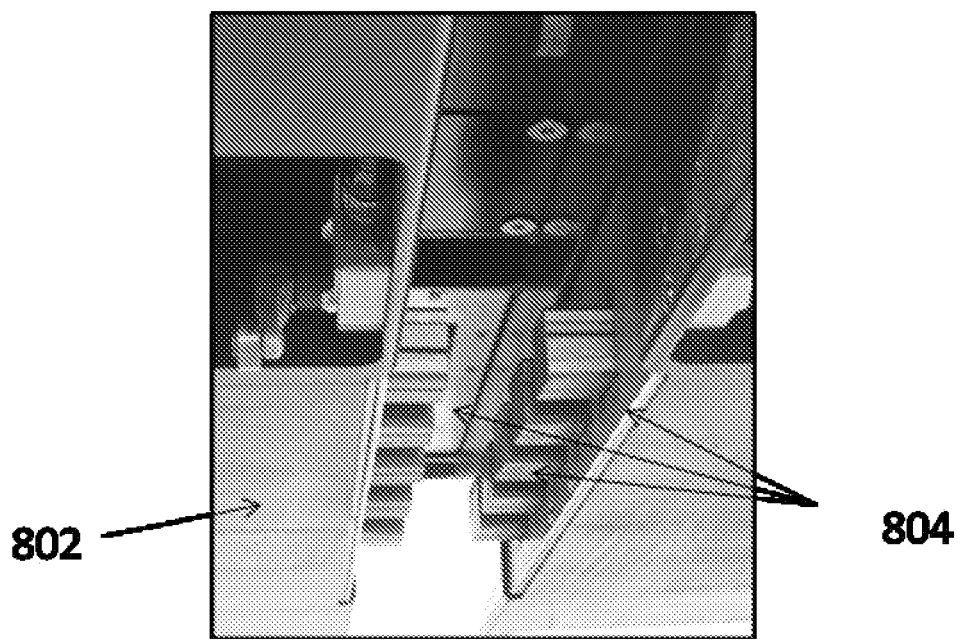
FIG. 8A is a bottom view of a charging connection of a charging station as provided in an embodiment of the invention.
Figure 8B:
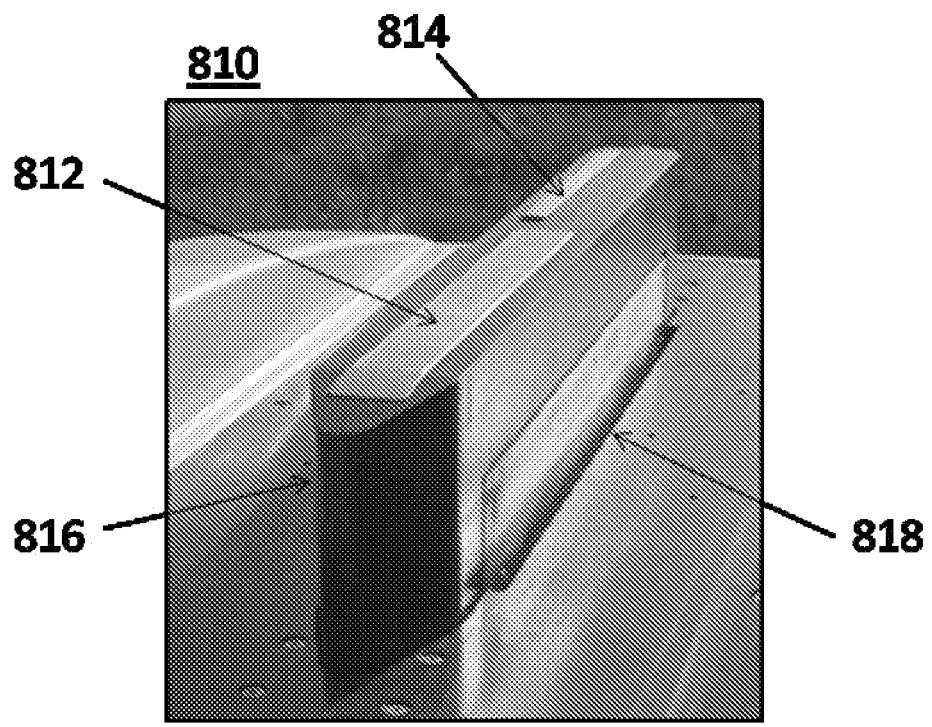
FIG. 8B is an example of a charging interface as provided in an embodiment of the invention.

FIG. 8A is a bottom view of a charging connection of a charging station as provided in an embodiment of the invention. As previously described with regard to FIG. 3, the charging connection 802 may employ one or more "brushes" 804 to provide an electrical contact between the charging connection 802 and a vehicle charging interface shown in FIG. 8B, FIG. 9, FIG. 11, and described herein. The brushes may be copper impregnated carbon brushes, or other conductive materials or coatings could also be used. A plurality of brushes may be employed to provide redundancy in the event of an issue with the one or more of the brushes and also enable the charging connection to handle high amounts of electric current needed to charge the vehicle within a short amount of time. For example, the amount of electric current provided may vary on the specific charging implementation used, but may range from 0 A to 50000 A or any amperage in between to charge the electric vehicle in the required amount of time. As shown in FIG. 8, the plurality of brushes may be arranged within an inner cavity of the charging connection, with the plurality of brushes separated into two groups on different sides of the inner cavity with one group providing the positive electrical connection from the charging station and the other group providing the negative electrical connection from the charging station. This arrangement protects the plurality of brushes from wear and tear and exposure to weather and external elements, while allowing the plurality of brushes to contact a charging interface on the electric vehicle.

One advantage of using brushes to provide the electrical connection for charging in comparison to conventional implementations is that the use of brushes allows for repeatable charging connections over a large number of charging cycles. Conventional electrical connections often use a plug-in connector with one pin used for the HV positive charge and a second pin used for the HV negative charge. Insertion and removal of such plug-in connectors often requires a high amount of force and the connector can be easily damaged during insertion or removal. Additionally, plug-in currents needed to handle high amounts of current may also be expensive, large, bulky, and heavy. In addition, the insertion and removal processes are typically performed by the driver and may require additional training and also raise additional safety concerns due to the driver being required to carry the weight of the HV cables required for connection, particularly if the charging station is far away from the electric vehicle during the charging process. Additional safety concerns may also arise due to improper placement of the plug-in connector. The use of brushes involves a low-force connection that is repeatable over multiple cycles and also does not require the driver to manually insert the connection or move HV cables during the charging process.

While a specific embodiment of the charging connection has been provided in FIG. 8A, other variations, changes, and substitutions could be implemented by those skilled in the art without departing from the invention. For example, other types of charging connections could be used, such as adapting the charging connection to work with a plurality of charging interfaces. The dimensions of the charging connection or charging interface could be changed, along with the relative positioning or interface method between the charging connection or charging interface. Different arrangements, number, spacing, or materials could be used for the plurality of brushes, and the brushes may have any form or shape other than those specifically described herein to contact the contact surfaces on the charging interface.

FIG. 8B is an example of a charging interface as provided in an embodiment of the invention. The charging interface 810 is located on the electric vehicle and is adapted to carry electrical current from the charging connection to batteries located in the electric vehicle while the electric vehicle has docked with a charging station. The charging interface may be located on top of the electric vehicle to provide easy access for the charging connection during the charging process. The charging interface may be left exposed while the vehicle is in operation, or a protective cover or other means may be used to protect the components of the charging interface while the vehicle is in operation and only retracted when the charging process is initiated. The charging interface 810 may include contacts (or switches) 812 and 814, which serve to ground the electric vehicle during the charging process. For example, the pilot contact 814 may also be used to provide a redundant on/off hard-wired control to ensure that charging is only initiated when the electric vehicle is properly docked. The contacts may be connected to circuitry which prevents charging of the electric vehicle from occurring if proper grounding of the electric vehicle is not present. This circuitry may be present on the electric vehicle, in the charging station or charge arm, or both. Charging interface 810 also includes contact surfaces 816 and 818 on opposite sides of the interface. As part of the charging process, the contact surfaces contact with the brushes 804 located on the charging connection to provide electrical charge from the charging station to batteries located on the electric vehicle, which will be described in more detail with regard to FIG. 8C.

Figure 8C:
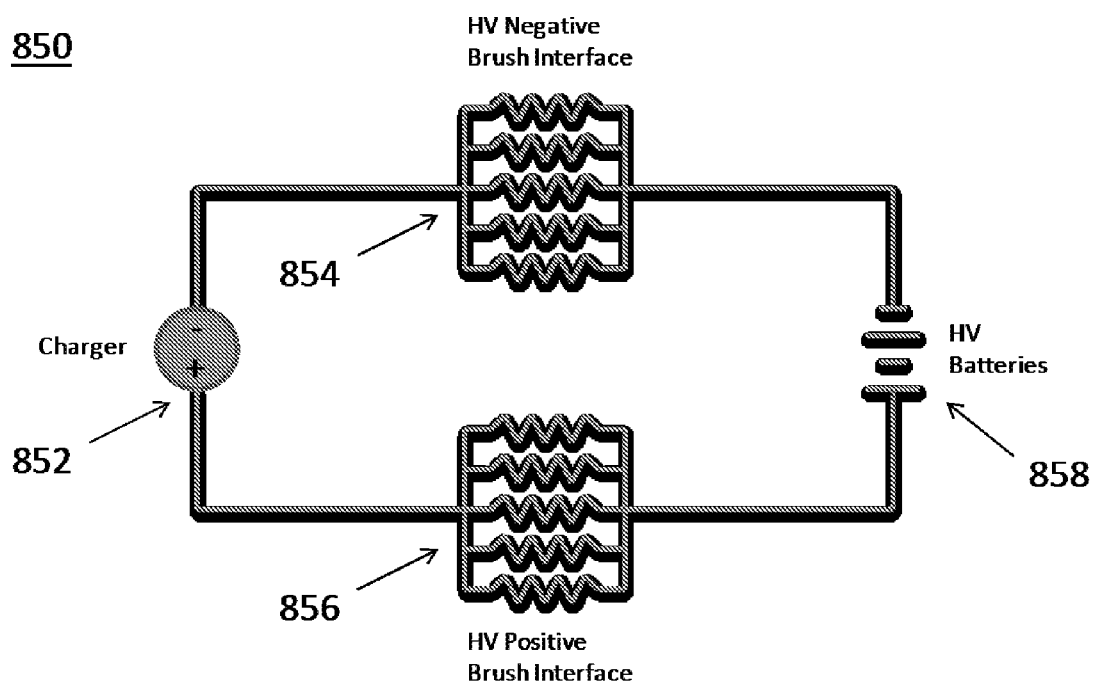
FIG. 8C is a simplified representation of a charging circuit used in the charging of an electric vehicle as provided in an embodiment of the invention.

FIG. 8C is a simplified representation of a charging circuit used in the charging interface of an electric vehicle as provided in an embodiment of the invention. Charging circuit 850 includes an electric charger 852, represented by a voltage source. As described above, the electric charger 852 is may be implemented as part of a charging station. The interface between the contact and the groups of the plurality of brushes on the charging connection when connected may be represented in charging circuit 850 as a network of resistors connected in parallel, with each resistor representing a brush interface. For example HV negative brush interface 854 and HV positive brush interface 856 may comprise a network of resistors connected in parallel, with each resistor representing an individual brush interface. One end of the HV negative brush interface is connected to the negative terminal of HV batteries 858, representing the high voltage batteries used in the electric vehicle. The positive terminal of HV batteries is connected to the HV positive brush interface, with the other end of HV positive brush interface connected to the electric charger.

The implementation shown in FIG. 8C allows for a high voltage, high current charging process to enable the electric vehicle to be charged in a short period of time. In order to carry the magnitude of electric current needed to charge the electric vehicle in the required amount of time, the brushes need to share the total amount of current delivered to the electric vehicle, as the total current required exceeds the total current that a single brush can currently carry. The division of current between the brushes may be determined as a product of the relative interface impedances of the brush contacts with the charging interface on the vehicle. While the individual brush current allowance does not change from brush to brush, the brush-to-brush impedance variation may cause an individual brush to carry most of the current. This can ultimately result in the total current capability being limited by a single brush if it has impedance significantly lower than the other brushes. For example, if five similar brush interfaces in HV negative brush interface 854 and HV positive brush interface 856 each are capable of X amps, then the entire brush interface is capable of operating under a total current of 5X. In order to ensure that the individual capacity of each brush is not exceeded, current measurements are made by the charge control system and the total charge current may be modulated to ensure that no single brush exceeds its current-carrying capacity. This ensures that greater amounts of current are not operating through each individual brush interface. In order to limit the overcurrent condition on any single brush, the current through the whole system can be limited.

FIG. 8C is a simplified diagram, and other configurations and arrangements of charging circuit 850 are possible. For example, a different number of charge interfaces or arrangement of circuits for HV negative brush interface 854 and HV positive brush interface 856 could be used.

One issue that arises with the use of brush interfaces is that the impedances between the brushes may vary due to the accumulation of dirt or debris on brushes, which may occur due to imperfections in the brush manufacturing process, operation of the electric vehicle, or exposure of the charging components to the elements over time. This poses a problem in that the amount of current flowing through each brush may vary, depending upon the individual impedance values for each of the brushes during charging. This can result in a loss of efficiency, or a longer charge time. The loss in efficiency is caused by a higher impedance at the brush interface. A longer charge time can result from the control system accommodating the weakest link in the brushes. Because the charging control system uses a single output that makes its way to the battery system through several brushes, one recourse to limit the current from exceeding the maximum of a particular brush is to limit the current from the charger as a result of the maximum current from all of the brushes. A single brush with an abnormally good connection can have very low impedance and the system will not be able to charge as fast because the current from the charger control will all be going through that brush. Additionally, a multi-brush approach helps to ensure that the brush interface has relatively low impedance. Without added sensors, a single interface conductor approach may not have a reference for the charging control system to recognize that a very high impedance connection was made that may be poor for the charging. A charging system designed with multiple brushes can have consistently better efficiency with slower charge times when brush-to-brush variation in impedance values increases over time.

One option is to periodically recondition the brushes prior to operation to maintain a more consistent impedance between the brushes. However, doing so manually may require the expenditure of additional labor on the part of technicians or drivers, who may require additional training for such a task. In addition, additional materials may be needed for the conditioning process, which may require owners of operators of the electric vehicle to purchase, store, and maintain stockpiles of these materials at their facilities. Furthermore, there may be additional safety measures that need to be in place for regular manual maintenance of the exposed high voltage parts. It may be easier to utilize a method and system through which the brushes on the charging connection could be automatically reconditioned as part of the docking and recharging process.

Figure 9:
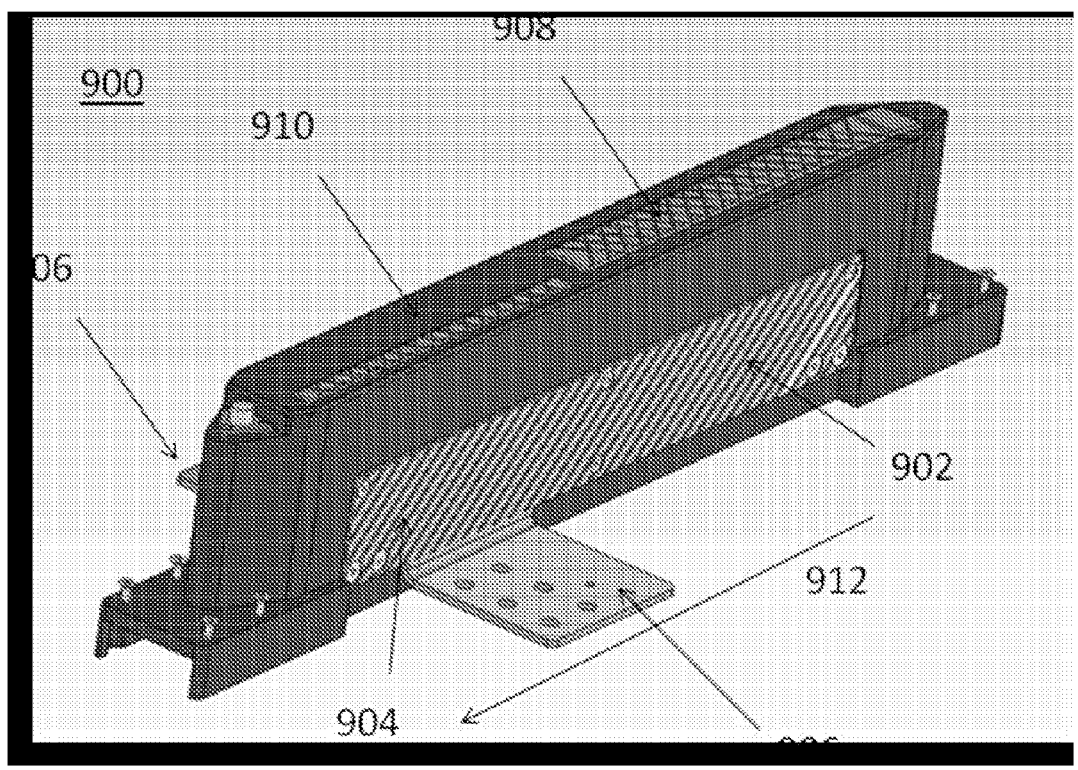
FIG. 9 is an example of a charging interface as provided in an embodiment of the invention.

FIG. 9 is an example of a charging interface as provided in an embodiment of the invention. The charging interface 900 is located on the electric vehicle and is adapted to carry electrical current from the charging interface to batteries located in the electric vehicle while the electric vehicle has docked with a charging station. The charging interface 900 may be located on top of the electric vehicle to provide easy access for the charging connection during the charging process, while also being out of reach of passengers. Other embodiments may include the interface below or on the side of the electric vehicle.

Charging interface 900 includes contact surfaces 902 and 906 on opposite sides of the interface that are used to contact the plurality of brushes in the charging connection during the charging process. In a specific embodiment, the contact surfaces 902 and 906 may be arranged on opposite sides in a lengthwise manner along charging interface 900, but other configurations and arrangements could also be used. For example, the size, orientation, and shape of contact surfaces 902 and 906 could be modified to accommodate a different interface mechanism depending upon the design of the charging connection used to dock with the charging interface 900. A different number of contact surfaces could also be employed. For example, two, three, four, or more contract surfaces could be used for the positive and negative electrical connections on the charging interface 900. Multiple vehicle-side contact surfaces can be provided to address space, size, and general scalability issues. The flat contact surfaces allow for a low-force connection and disconnection of the charging connection, which helps to ensure that the charging connection is not entangled with the electrical vehicle should the driver accidentally resume operation of the electric vehicle prior to full disengagement of the charging connection.

Contact surfaces 902 and 906 may be flat, chrome-plated copper bus bars adapted to transfer HV loads from the charging interface through electrical connections in the electric vehicle to the vehicle's HV batteries. The chrome plating may be used to increase corrosion resistance of the underlying copper, allow for easier cleaning procedures, or increase the hardness of the contact surfaces. Alternative materials other than copper could also be used, including aluminum or any other conductive material. Similarly, other treatments could be applied, or not applied, to the contact surfaces to increase the efficiency and ease of operation of the charging process other than chrome plating. The Contact surfaces may also be integrally formed with mounting surfaces 906 to enable charging interface 900 to be properly positioned and mounted on the surface of the electric vehicle.

Contact surfaces 902 and 906 incorporate grooves 904 that act as light file edges so that during the docking process, the brushes are dragged across the grooved contact surfaces 902 and 906 and a thin surface area is removed from each of the brushes. This cleaning action not only serves to renew the brush surfaces themselves, but also serves to remove any surface dirt, debris, oxidation, or other contaminants that may be present on the brush. Each of the grooves 904 may be arranged substantially in parallel to each other to allow for the dragging motion to be uniformly applied across the brushes. For example, the grooves 904 may be arranged at between a 20-60 degree angle to a direction of movement of the electric vehicle. The contact surface is mounted on the charging interface and the grooves 904 are angled so that the shaving motion on the brush carries the carbon material from the brushes and any contaminants down and away from the contact surface, to prevent such debris from accumulating on either the contact surface or the brushes. This creates a self-cleaning effect for the contact surface filing action for the brushes, and the excess carbon material and contaminants may fall off from the charging interface as the electric vehicle progresses on its route. The file action may also be implemented as a hatching pattern, stamping pattern, or any of mechanism to provide relief to the charge contacts. The filing action may also occur on a feature on the vehicle that is not part of the charge contact interfaces. Furthermore, the vehicle interfaces may be similarly conditioned by the charge connection.

Upon movement of the contact surface 902 relative to the brushes, a portion of the brushes can be removed from the contact surface 902. The removed brushes may not contact the contact surface 902. Remaining brushes that are in contact with the contact surface 902 can be in electrical contact with the contact surface 902. In some situations, at least a portion but not all of the brushes is removed from the contact surface 902. For example, at least 1%, 5%, 10%, 15%, 20%, 30%, 40%, 50%, 60%, 70%, 80%, 90%, or 95% of the brushes are removed from the contact surface 902.

The brush shaving action helps to create well-balanced impedances between the charging brushes and the contact surfaces on the vehicle charging interface. This allows the charging system to consistently reach high rates of charge while avoiding the varied impedance values that may arise as a result of debris or contaminants on the brushes.

Charging interface 900 may also include contacts (or switches) 908 and 910 that are used as part of a safety interlock system. Contacts 908 and 910 are located on the top surface of charging interface 900, but may be located in other locations in accordance with the specific charging design being implemented. Contacts 908 and 910 may be used to ensure that the charging interface 900 is properly seated with the charging connection from the charging station prior to commencement of the charging process. For example, contacts 908 and 910 may be coupled to interface hardware on the charging connection 802 to communicate to the charging station that the charging interface 900 is properly seated with the charging connection 802 to enable to HV current to flow to the HV batteries of the electric vehicle. If contacts 908 and 910 are not properly aligned, a discrete control input or an error CAN message may be provided that may stop the docking procedure and a problem may be reported. The interface hardware on charging connection 802 may also utilize one or more brushes to form an electrical connection that is used to control the current passing through contact surfaces 902 and 906.

Contacts 908 and 910 may also include crosshatching that operates in a similar manner to the grooves 904 to remove a portion of the brushes used in the charging connection for a safety interlock system. Unlike grooves 904, crosshatching may be used because the contacts 908 and 910 are on the top surface of the electric vehicle, and the use of grooves aligned in a single direction could push any brush shavings or contaminants to one side of the charging interface. In addition, the cross-hatching may be more closely spaced together than grooves 904 to allow for increased scraping action for those brushes. Cross-hatching may also be used as the location of the grooves on the top surface of the charging interface may make it more difficult to remove the shavings or debris from the contacts, as the shavings and debris tend to stay on the contacts rather than moving downwards off the top of the charging interface 900.

Figure 10:
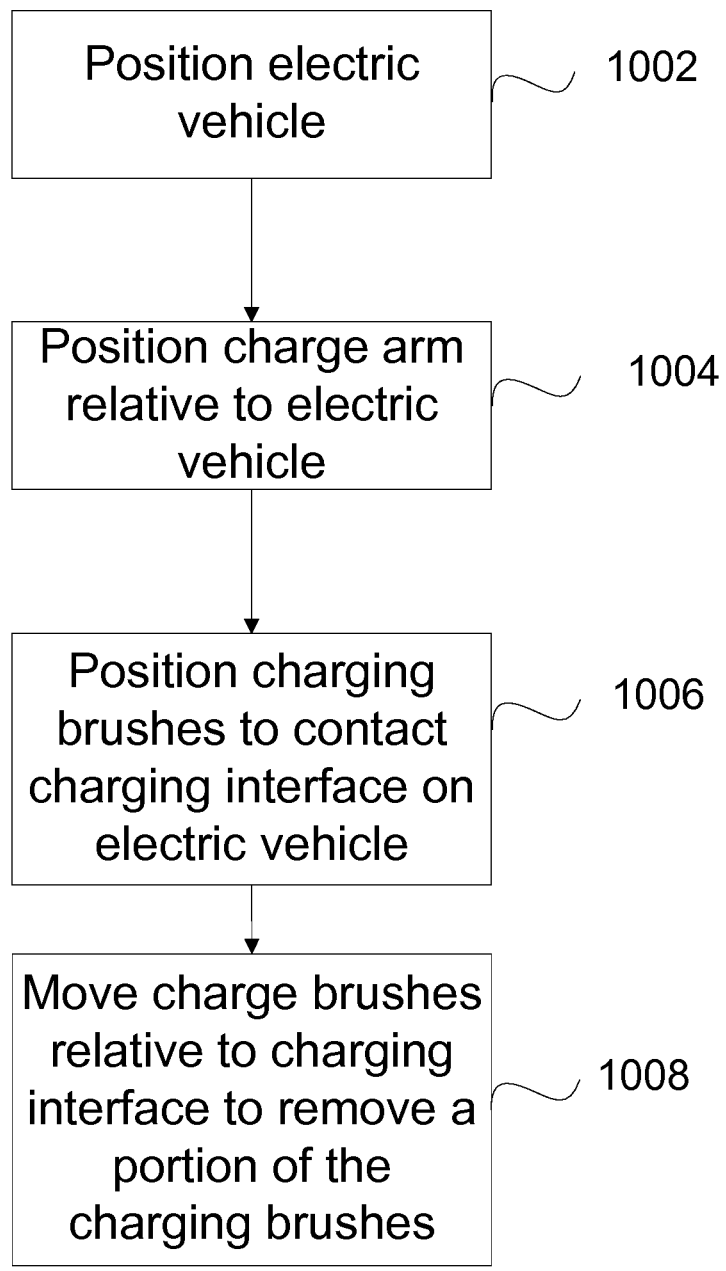
FIG. 10 is a sample process flow for a method of enabling fast charge as provided in an embodiment of the invention.

This self-cleaning process may be better understood in conjunction with FIG. 10, which is a sample process flow for a method of enabling fast charge as provided in an embodiment of the invention. In operation 1002, the electric vehicle is positioned to begin the docking process. As shown in FIGS. 4-6, certain systems and processes may be used to determine the location of the electric vehicle relating to the charging station to provide feedback as to how the electric vehicle should be positioned to initiate the charging process.

In operation 1004, the location of the charging arm is positioned relative to the location of the electric vehicle so that the charging arm may be coupled with the charging interface on the electric vehicle. As shown in FIGS. 6C, 6D, 7C, and 7D, this may be performed by first connecting the charging arm with the electric vehicle, and then moving the electric vehicle into position either manually or using an automated vehicle positioning system. Alternatively the charging arm may be independently positioned while the electric vehicle is kept in a stationary position, or the charging arm may be held in a fixed location while the electric vehicle moves into position, or any combination of the two.

In operation 1006, the charging brushes are positioned to contact the charging interface on the electric vehicle. The charging brushes are normally kept in a retracted position during non-operation, but are extended from their housing to contact the contact surfaces on the charging interface. For example, the brushes may extend 0.5 inches, 1 inch, 1.25 inches, 1.5 inches, 2 inches, or other lengths that enable the charging brushes to contact the contact surfaces on the charging interface. The brushes may be extended using pneumatic pressure and retracted using spring force, but other methods could also be used. If contacts 908 and 910 have been properly aligned and all other safety guidelines in the charging process have been satisfied, the charging process may begin by providing electrical current from the charging station to the batteries in the electric vehicle.

In operation 1008, the charging brushes are moved relative to the charging interface to remove a portion of the charging brushes. The charging brushes are still in an extended state to contact the grooves on the contact surfaces to create a brush-shaving action. This is typically performed after the charging process has been completed, but could also be performed before the charging process, or both. Depending upon the configuration of the charging system, the charging arm may be moved while the electric vehicle is kept in a stationary position, or the electric vehicle may be moved while the charging arm is kept in a stationary position, or the electric vehicle and charging arm may both be moved in operation 1008. The brushes may be moved in direction 912 across the length of the contact surfaces so that each of the charging brushes contacts the grooves, thus creating the cleaning action.

The movement in operation 1008 of the charging arm or electric vehicle may also be controlled to ensure that the charging brushes each receive the same amount of self-cleaning action in the cleaning process. The length of the contact surface is typically longer than the combined width of the brushes to allow for greater tolerance in the charging process, as a longer contact surface offers more room for error in case the position of the charging brushes is slightly off. For example, if the total length of the contact surface was 36 inches, then the combined width of the brushes could be 18 inches. The brushes are moved so that the leading brush in the direction of motion 912 does not move past the end of the contact surface and potentially scrape against other portions of charging interface 900. This also helps to ensure that each of the brushes receives the same amount of self-cleaning, as the brushes are in contact with the grooves on the contact plate for the same amount of time during operation 1008.

Other mechanisms other than those described herein could also be employed to create a similar self-cleaning action for the brushes. For example, different textured surfaces could be used in places of the grooves on the contact surface, or different material selections with different properties could be used in pace of those mentioned for the contact surfaces or the brushes. Alternatively, a different contact arrangement could also be employed, with a single contact having additional contact area, rather than two contacts arranged on opposite sides of a charging interface.

Figure 11:
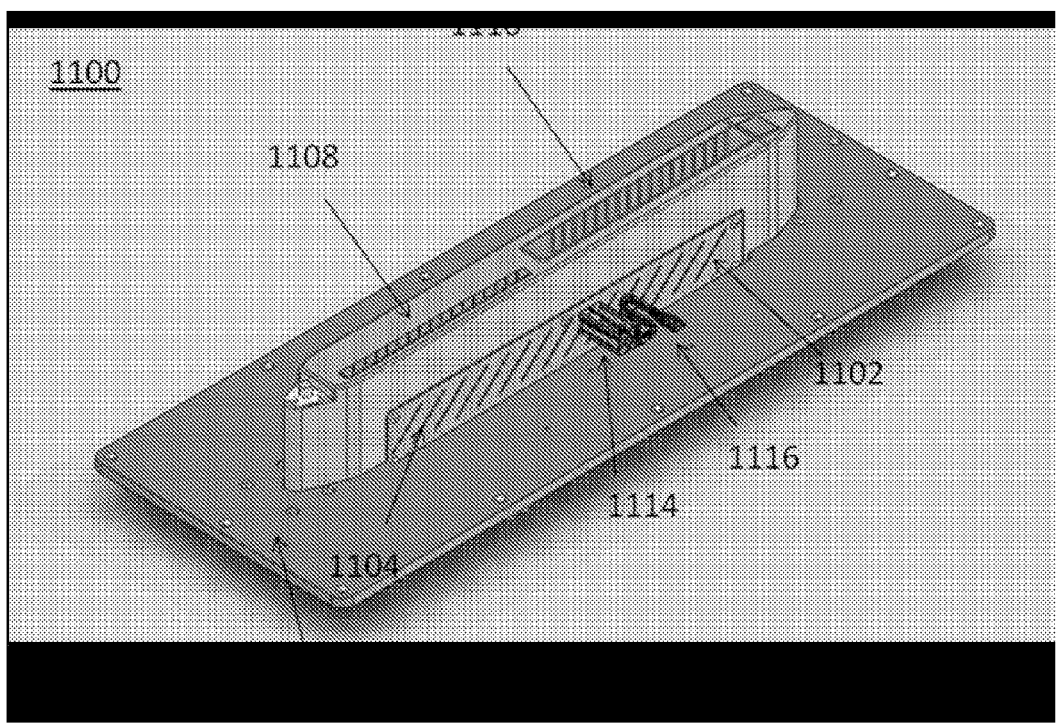
FIG. 11 is an alternative example of a charging interface as provided in an embodiment of the invention.

FIG. 11 is an alternative example of a charging interface as provided in an embodiment of the invention. For example, charging interface 1100 incorporates grooves 1104 that are spaced more widely than those shown in FIG. 9. This may reduce the amount of self-cleaning action performed during the cleaning process. A charging brush 1114 is also shown in relation to the charging interface 1100. The charging brush is connected to charging bar 1116, which is connected to other elements in the charging connection. As described above, a plurality of brushes may be employed to contact the charging surface 1102. Charging interface 1100 may also be mounted directly upon mounting plate 1118 to allow the entire charging interface 1100 and mounting plate 1118 to be removed from the electric vehicle for maintenance or repair. Charging interface 1100 may also incorporate contacts 1108 and 1110, which may incorporate grooves (as shown) or crosshatching for self-cleaning of the contact brushes on the charging connection.

Figure 12:
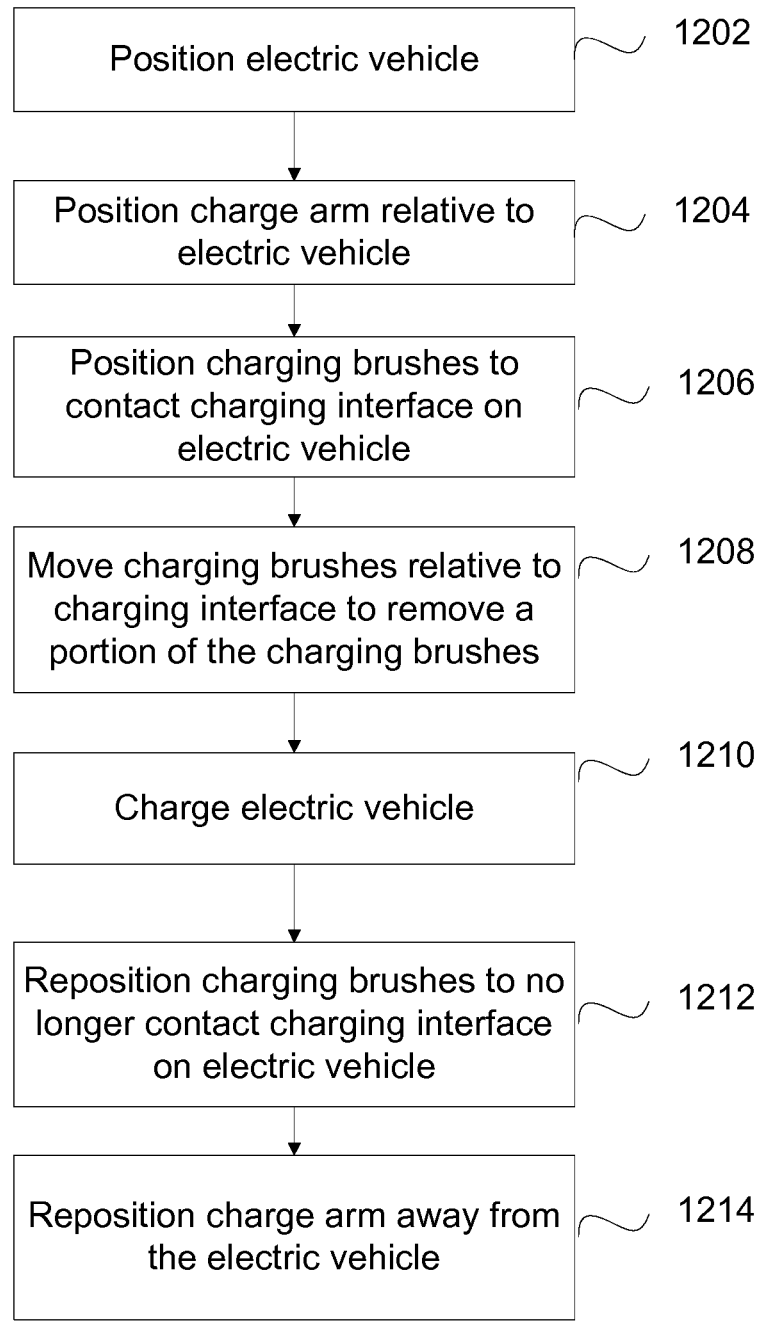
FIG. 12 is a sample process flow for a method of enabling fast charge as provided in an embodiment of the invention.

FIG. 12 is a sample process flow for a method of enabling fast charge as provided in an embodiment of the invention. In operation 1202, the electric vehicle is positioned to a desired location for charging. As shown in FIGS. 4-6, certain systems and processes may be used to determine the location of the electric vehicle relating to the charging station to provide feedback as to how the electric vehicle should be positioned to initiate the charging process.

In operation 1204, the charging arm is positioned relative to the location of the electric vehicle so that the charging arm may be coupled with the charging interface on the electric vehicle. As shown in FIGS. 6C, 6D, 7C, and 7D, this may be performed by first connecting the charging arm with the electric vehicle, and then moving the electric vehicle into position either manually or using an automated vehicle positioning system. Alternatively the charging arm may be independently positioned while the electric vehicle is kept in a stationary position, or the charging arm may be held in a fixed location while the electric vehicle moves into position, or any combination of the two.

In operation 1206, the charging brushes are positioned to contact the charging interface on the electric vehicle. The charging brushes are normally kept in a retracted position during non-operation, but are extended from their housing to contact the contact surfaces on the charging interface. The brushes may be extended using pneumatic pressure and retracted using spring force, but other methods could also be used.

In operation 1208, the charging brushes are moved relative to the charging interface to remove a portion of the charging brushes. The charging brushes are still in an extended state to contact the grooves on the contact surfaces to create a brush-shaving action. This is typically performed before the charging process has been completed, but could also be performed after the charging process, or both. One advantage of performing the self-cleaning process prior to charging is that the reconditioned brushes do not have time to oxide before the next charge, as the charging process is performed soon after the self-cleaning process. Depending upon the configuration of the charging system, the charging arm may be moved while the electric vehicle is kept in a stationary position, or the electric vehicle may be moved while the charging arm is kept in a stationary position, or both the electric vehicle and charging arm may be moved in operation 1208. The brushes may be moved in a direction across the length of the contact surfaces so that each of the charging brushes contacts the grooves, thus creating the cleaning action.

The movement in operation 1208 of the charging arm or electric vehicle may also be controlled to ensure that the charging brushes receive each receive the same amount of self-cleaning action in the cleaning process. The length of the contact surface will typically be longer than the combined width of the brushes to allow for greater tolerance in the charging process. If the total length of the contact surface was 36 inches, then the combined width of the brushes could be 18 inches. The brushes could be moved so that the leading brush in the direction of motion does not move past the end of the contact surface and potentially scrape against other portions of charging interface. This also helps to ensure that each of the brushes receives the same amount of self-cleaning, as the brushes are in contact with the grooves on the contact plate for the same amount of time.

In operation 1210, if the safety interlocks have been properly aligned and all other safety guidelines in the charging process have been satisfied, the charging process may begin by providing electrical current from the charging station to the batteries in the electric vehicle through the charging brushes and the charging interface.

In an alternative embodiment, operation 1210 may be performed before operation 1208 to charge the electric vehicle prior to moving the charge brushes relative to the charging interface to remove a portion of the charge brushes. This may be performed to allow for additional flexibility in the charging process for the electric vehicle.

In operation 1212, the charging brushes are repositioned so that they no longer contact the charging interface on the electric vehicle. For example, the charging brushes could be retracted into their housings using pneumatic pressure but other methods could also be used. Repositioning of the charging brushes allows for the charging brushes be protected from wear and tear while charging is not taking place.

In operation 1214, the charging arm is repositioned away from the position of the electric vehicle and the charging interface. This operation enables the vehicle to resume its regular route, without the risk of damaging the charging arm or charging interface through collision between the charging arm and the electric vehicle. In an alternative embodiment, operations 1206 and 1212 may be omitted depending upon the design of the housing in the charging interface. For example, the brushes or other charging elements used in the charging interface may be fixed in place and do not extend or retract. In this instance, the contact between the brushes and the charging interface may be initiated during operation 1204 and may be separated during operation 1214.

In another embodiment of the invention, the cleaning process could be done periodically by a separate cleaning vehicle or apparatus that applies these same methods as described herein, but not as part of the electric vehicle itself. The cleaning process could also be implemented as a separate feature on the electric vehicle independent of the charging process or equipment used in the charging process.

Control Systems

Figure 13:
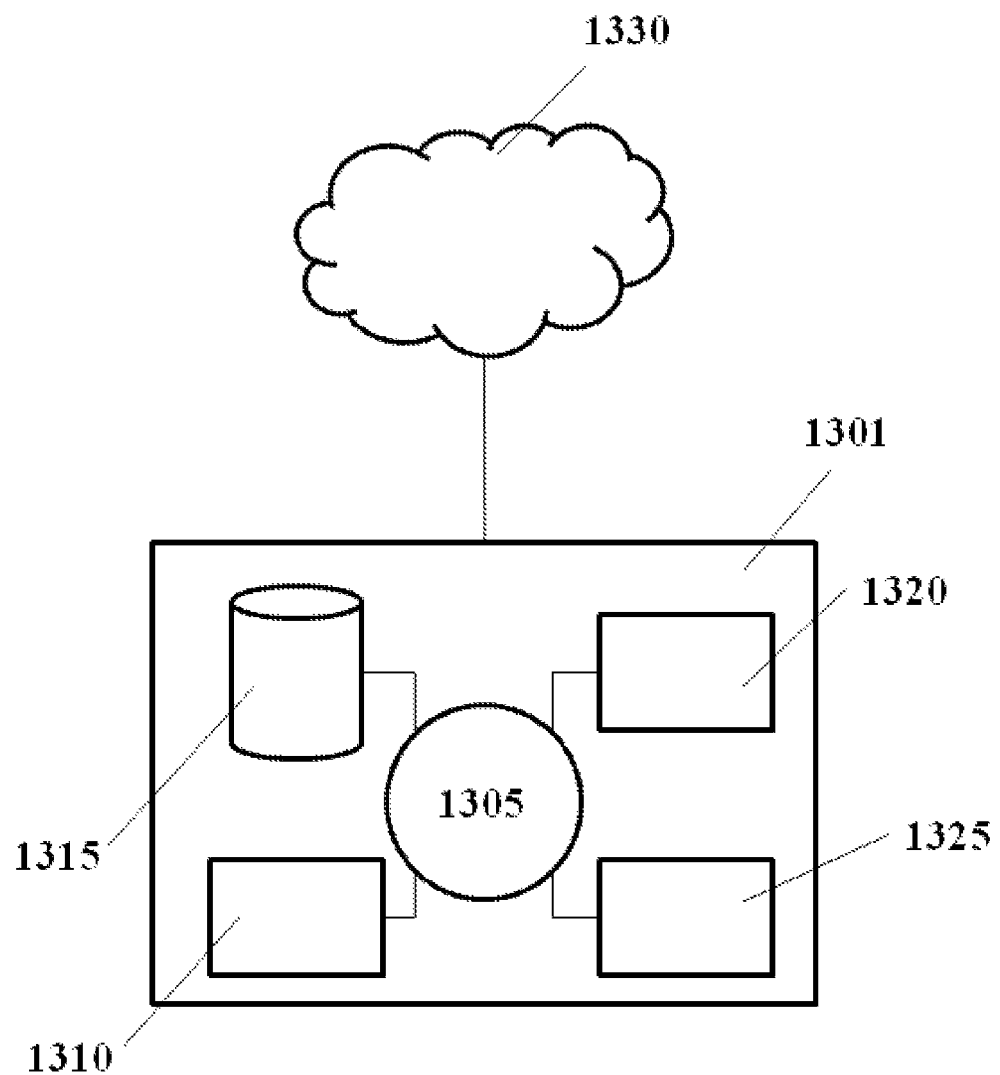
FIG. 13 shows a computer control system that is programmed or otherwise configured to direct the charging and/or discharging of an electric vehicle according to methods of the present disclosure.

The present disclosure provides computer control systems that are programmed to implement or direct systems and methods provided herein. FIG. 13 shows a computer system 1301 that is programmed or otherwise configured to implement vehicle charging and/or discharging. The computer system 1301 includes a central processing unit (CPU, also "processor" and "computer processor" herein) 1305, which can be a single core or multi core processor, or a plurality of processors for parallel processing. The computer system 1301 also includes memory or memory location 1310 (e.g., random-access memory, read-only memory, flash memory), electronic storage unit 1315 (e.g., hard disk), communication interface 1320 (e.g., network adapter) for communicating with one or more other systems, and peripheral devices 1325, such as cache, other memory, data storage and/or electronic display adapters. The memory 1310, storage unit 1315, interface 1320 and peripheral devices 1325 are in communication with the CPU 1305 through a communication bus (solid lines), such as a motherboard. The storage unit 1315 can be a data storage unit (or data repository) for storing data. The computer system 1301 can be operatively coupled to a computer network ("network") 1330 with the aid of the communication interface 1320. The network 1330 can be the Internet, an internet and/or extranet, or an intranet and/or extranet that is in communication with the Internet. The network 1330 in some cases is a telecommunication and/or data network. The network 1330 can include one or more computer servers, which can enable distributed computing, such as cloud computing. The network 1330, in some cases with the aid of the computer system 1301, can implement a peer-to-peer network, which may enable devices coupled to the computer system 1301 to behave as a client or a server.

The CPU 1305 can execute a sequence of machine-readable instructions, which can be embodied in a program or software. The instructions may be stored in a memory location, such as the memory 1310. Examples of operations performed by the CPU 1305 can include fetch, decode, execute, and writeback.

The storage unit 1315 can store vehicle data. The computer system 1301 in some cases can include one or more additional data storage units that are external to the computer system 1301, such as located on a remote server that is in communication with the computer system 1301 through an intranet or the Internet.

The computer system 1301 can communicate with one or more remote computer systems through the network 1330. For instance, the computer system 1301 can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1301 via the network 1330.

Methods as described herein can be implemented by way of machine (e.g., computer processor) executable code stored on an electronic storage location of the computer system 1301, such as, for example, on the memory 1310 or electronic storage unit 1315. The machine executable or machine readable code can be provided in the form of software. During use, the code can be executed by the processor 1305. In some cases, the code can be retrieved from the storage unit 1315 and stored on the memory 1310 for ready access by the processor 1305. In some situations, the electronic storage unit 1315 can be precluded, and machine-executable instructions are stored on memory 1310.

The code can be pre-compiled and configured for use with a machine have a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1301, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Although some examples above have shown an electric vehicle comprising contact surfaces with grooves and a charging station comprising a charging arm with brushes, in alternative examples, the electric vehicle can include charging brushes and the charging station can include contact surfaces with grooves. The charging brushes can be coupled to a charging arm that can raise or lower the charging brushes away from or towards the electric vehicle, respectively.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. An electric bus, comprising:
    a first charge-receiving electrode and a second charge-receiving electrode positioned on a roof of the electric bus, wherein the first charge-receiving electrode is configured to engage with a first charging electrode of a charging station and the second charge-receiving electrode is configured to engage with a second charging electrode of the charging station when the electric bus connects with the charging station for charging; and
    one or more structural filing features positioned on the electric bus and configured remove a portion of the first charging electrode and the second charging electrode of the charging station, to recondition the first charging electrode and the second charging electrode, when the electric bus connects with the charging station for charging.

2. The electric bus of claim 1, wherein the one or more structural filing features includes a plurality of grooves on the first charge-receiving electrode and the second charge-receiving electrode.

3. The electric bus of claim 2, wherein the first charge-receiving electrode and the second charge-receiving electrode includes copper.

4. The electric bus of claim 2, wherein the plurality of grooves are parallel to each other.

5. The electric bus of claim 4, wherein the plurality of grooves are aligned at an angle between 20 and 60 degrees with respect to a direction of travel of the electric bus.

6. The electric bus of claim 1, wherein the first charging electrode and the second charging electrode comprise copper impregnated carbon brushes.

7. The electric bus of claim 1, wherein the first charge-receiving electrode includes a first contact surface that is configured to engage with the first charging electrode and the second charge-receiving electrode includes a second contact surface that is configured to engage with the second charging electrode, and wherein the one or more structural filing features are indentations on the first contact surface and the second contact surface.

8. The electric bus of claim 7, wherein the indentations on the first contact surface are configured to remove the portion of the first charging electrode when the first charging electrode is in contact with the first contact surface, and the indentations on the second contact surface are configured to remove the portion of the second charging electrode when the second charging electrode is in contact with the second contact surface, wherein during a charging process, the first contact surface is used as a positive electrical connection and the second contact surface is used as a negative electrical connection.

9. The charging interface of claim 8, wherein the indentations on the first contact surface and the second contact surface include grooves.

10. A method for charging an electric bus at a charging station, comprising:
    positioning an electric bus for charging at the charging station, the electric vehicle including a first charge-receiving electrode and a second charge-receiving electrode, wherein the first charge-receiving electrode is configured to engage with a first charging electrode of the charging station and the second charge-receiving electrode is configured to engage with a second charging electrode of the charging station when the electric bus connects with the charging station for charging;
    connecting the electric bus with the charging station for charging, wherein the connecting includes removing a portion of the first charging electrode and the second charging electrode of the charging station to recondition the first charging electrode and the second charging electrode prior to charging;
    establishing electrical contact between (a) the first charging electrode and the first charge-receiving electrode and (b) the second charging electrode and the second charge-receiving electrode; and
    charging the electric bus by directing electric current from the charging station to the electric bus through the first charging electrode and the second charging electrode.

11. The method of claim 10, wherein the first charge-receiving electrode and the second charge-receiving electrode include a plurality of indentations that act to shave off the portion of the first charging electrode and the second charging electrode when the electric bus connects with the charging station for charging.

12. The method of claim 11, wherein the plurality of indentations are a plurality of grooves aligned at an angle between 20 and 60 degrees with respect to a direction of movement of the electric bus.

13. The method of claim 10, wherein removing a portion of the first charging electrode and the second charging electrode includes:
contacting the first charging electrode and the second charging electrode with one or more structural filing features; and
moving the one or more structural filing features with respect to the first charging electrode and the second charging electrode after the contacting to remove the portion of the first charging electrode and the second charging electrode.

14. The method of claim 13, wherein the one or more structural filing features are positioned on the electric bus, and wherein moving the one or more structural filing features includes moving the electric bus with respect to the charging station.

15. The method of claim 10, wherein removing a portion of the first charging electrode and the second charging electrode includes moving the electric bus with respect to the charging station with the first charging electrode in contact with the first charge-receiving electrode and the second charging electrode in contact with the second charge-receiving electrode.

16. A charging system for charging of an electric bus, comprising:
a charging station comprising a plurality of charging electrodes configured to engage with a plurality of charge-receiving electrodes of the electric bus to direct electric current therethrough; and
an electric bus comprising at least one battery electrically coupled to a first charge-receiving electrode and a second charge-receiving electrode of the plurality of charge-receiving electrodes, wherein the first charging electrode is configured to slide on the first charge-receiving electrode and the second charging electrode is configured to slide on the second charge-receiving electrode when the plurality of charging electrodes engage with the plurality of charge-receiving electrodes, and wherein the first charge-receiving electrode and the second charge-receiving electrode each includes one or more structural filing features configured remove a portion of the first charging electrode and the second charging electrode, to recondition the first charging electrode and the second charging electrode, when the plurality of charging electrodes engage with the plurality of charge-receiving electrodes.

17. The system of claim 16, wherein the one or more structural filing features comprise a plurality of grooves parallel to each other.

18. The system of claim 17, wherein the plurality of grooves are aligned at an angle between 20 and 60 degrees with respect to a direction of movement of the electric bus.

19. The charging system of claim 16, wherein the plurality of charge-receiving electrodes are positioned on a roof the electric bus.

20. The charging system of claim 19, wherein the plurality of charge-receiving electrodes extend along a direction of travel of the electric bus.

* * * * *